(12) United States Patent
Steiger et al.

(10) Patent No.: US 7,784,885 B2
(45) Date of Patent: Aug. 31, 2010

(54) ADJUSTABLE SHELVING AND STORAGE SYSTEM FOR VEHICLES

(75) Inventors: William D. Steiger, Louisville, KY (US); Dale A. Panasewicz, Strongsville, OH (US); Dennis M. Futo, Strongsville, OH (US)

(73) Assignee: L&P Property Management Company, Southgate, CA (US)

( * ) Notice: Subject to any disclaimer, the term of this patent is extended or adjusted under 35 U.S.C. 154(b) by 0 days.

(21) Appl. No.: 11/237,189

(22) Filed: Sep. 28, 2005

(65) Prior Publication Data

US 2007/0069542 A1 Mar. 29, 2007

(51) Int. Cl.
*A47B 77/00* (2006.01)
*A47B 9/00* (2006.01)

(52) U.S. Cl. .................. 312/107; 108/147.16; 108/106

(58) Field of Classification Search ................ 312/107, 312/328, 327, 108, 109, 257.1, 264, 330.1; 296/24.1, 37.1, 37.6, 37.8, 37.13–37.16; 108/92, 93, 96, 101; 224/402
See application file for complete search history.

(56) References Cited

U.S. PATENT DOCUMENTS

| | | | | |
|---|---|---|---|---|
| 1,115,345 A | * | 10/1914 | Steuernagel | ................ 312/109 |
| 1,833,081 A | * | 11/1931 | Kilmer | ......................... 217/36 |
| 1,954,085 A | * | 4/1934 | McMillan | ................ 206/362.1 |
| 2,424,217 A | | 7/1947 | Bales | |
| 2,721,632 A | | 10/1955 | Surpierre | |
| 2,766,092 A | * | 10/1956 | Dennison | ................. 312/257.1 |
| 2,811,404 A | * | 10/1957 | Brooks et al. | ............... 312/122 |
| 2,978,153 A | | 4/1961 | Brindle | |
| 3,276,399 A | * | 10/1966 | Canfield | ...................... 108/60 |
| 3,323,656 A | | 6/1967 | Weiss et al. | |
| 3,338,651 A | * | 8/1967 | Jacobson | .................... 312/240 |
| 3,341,270 A | | 9/1967 | Sohl | |
| 3,572,874 A | | 3/1971 | Hassel | |
| 3,848,942 A | | 11/1974 | Fanini | |
| 4,191,436 A | | 3/1980 | Cherry | |
| 4,249,295 A | | 2/1981 | Lance | |
| 4,418,967 A | * | 12/1983 | Winkelman et al. | ......... 312/107 |
| 4,681,381 A | | 7/1987 | Sevey | |
| 4,689,726 A | * | 8/1987 | Kretzschmar | ............... 362/127 |
| 4,815,394 A | | 3/1989 | Ettlinger et al. | |
| 4,852,749 A | * | 8/1989 | Fernandez et al. | ....... 211/126.2 |
| 5,048,902 A | * | 9/1991 | Daly | ....................... 312/249.8 |

(Continued)

OTHER PUBLICATIONS http://www.capworld.com/TruckAccessories/ByManufacturer/crown.htm, Sep. 22, 2005; 4 pgs.

(Continued)

*Primary Examiner*—Darnell M Jayne
*Assistant Examiner*—Timothy M Ayres
(74) *Attorney, Agent, or Firm*—Michael Best & Friedrich LLP

(57) ABSTRACT

An adjustable storage system includes one or more adjustable storage units. The storage units generally comprise opposing panels comprising a polymer material and one or more shelf supports means that are integral with the panels. Shelves and/or drawers, also made from polymer materials, may then be disposed between the panels. Storage units may be added to the storage system by adding additional panels. In some embodiments, adjacent storage units of a storage unit may share a panel.

19 Claims, 19 Drawing Sheets

U.S. PATENT DOCUMENTS

| | | | |
|---|---|---|---|
| 5,244,265 A * | 9/1993 | Chiang | 312/107 |
| 5,327,682 A * | 7/1994 | Holtz | 49/463 |
| D355,798 S | 2/1995 | Goetz | |
| 5,398,987 A | 3/1995 | Sturgis | |
| 5,466,058 A * | 11/1995 | Chan | 312/111 |
| 5,482,342 A * | 1/1996 | Kowalski et al. | 294/160 |
| 5,498,048 A | 3/1996 | Shelby, Jr. | |
| 5,590,939 A | 1/1997 | Piontek | |
| D379,615 S * | 6/1997 | Hellhake et al. | D12/423 |
| D379,616 S * | 6/1997 | Hellhake et al. | D12/423 |
| 5,642,923 A * | 7/1997 | Meacham et al. | 312/258 |
| 5,743,584 A | 4/1998 | Lance et al. | |
| 5,743,607 A * | 4/1998 | Teufel et al. | 312/265.2 |
| 5,762,213 A | 6/1998 | Heneveld, Sr. | |
| 5,813,735 A * | 9/1998 | Wu | 312/204 |
| 5,893,620 A * | 4/1999 | Birgelis | 312/408 |
| 5,897,154 A | 4/1999 | Albertini et al. | |
| 5,988,476 A | 11/1999 | Olerio | |
| 6,007,129 A | 12/1999 | Kearney, Jr. | |
| D420,970 S | 2/2000 | Sacco et al. | |
| 6,042,244 A * | 3/2000 | Witkoski | 362/133 |
| 6,050,660 A | 4/2000 | Gurley | |
| D426,512 S | 6/2000 | Ciuba | |
| D426,728 S | 6/2000 | Lara | |
| D429,095 S | 8/2000 | Grosfillex | |
| 6,138,583 A | 10/2000 | Mahone et al. | |
| 6,186,456 B1 | 2/2001 | Marsh | |
| 6,189,945 B1 | 2/2001 | Rockett | |
| 6,203,087 B1 | 3/2001 | Lance et al. | |
| 6,231,205 B1 * | 5/2001 | Slesinger et al. | 362/133 |
| 6,386,412 B1 * | 5/2002 | Konechne | 224/543 |
| 6,422,629 B2 | 7/2002 | Lance et al. | |
| 6,520,514 B2 | 2/2003 | Clegg | |
| 6,561,601 B1 | 5/2003 | Maffeo | |
| 6,641,236 B2 | 11/2003 | Grudzien | |
| 6,644,712 B1 | 11/2003 | Rafi-Zadeh | |
| D485,227 S | 1/2004 | Graham | |
| D498,617 S | 11/2004 | Murphy et al. | |
| 6,824,184 B2 | 11/2004 | Leitner et al. | |
| 6,824,232 B2 * | 11/2004 | Farmer | 312/293.2 |
| D509,178 S | 9/2005 | Panasewicz et al. | |
| D525,934 S | 8/2006 | Panasewicz et al. | |
| D536,659 S | 2/2007 | Panasewicz et al. | |
| D539,036 S | 3/2007 | Potts et al. | |
| D549,154 S | 8/2007 | Panasewicz et al. | |
| D553,555 S | 10/2007 | Panasewicz et al. | |
| 7,318,614 B2 | 1/2008 | Steiger et al. | |
| D566,649 S | 4/2008 | Panasewicz et al. | |
| 2005/0168115 A1 * | 8/2005 | Moon et al. | 312/257.1 |
| 2005/0225108 A1 | 10/2005 | Panasewicz et al. | |
| 2006/0175945 A1 * | 8/2006 | Deguchi | 312/257.1 |
| 2008/0012375 A1 | 1/2008 | Steiger et al. | |

OTHER PUBLICATIONS

Canadian Intellectual Property Office Office Action, received for Canadian Patent Application No. 2,553,095, mailed Mar. 12, 2009.

U.S. Patent and Trademark Office Non-Final Office Action, received for U.S. Appl. No. 11/501,476, mailed Dec. 10, 2008.

U.S. Patent and Trademark Office Non-Final Office Action, received for U.S. Appl. No. 11/501,476, mailed Mar. 30, 2009.

U.S. Patent and Trademark Office Non-Final Office Action, received for U.S. Appl. No. 10/821,366, mailed Feb. 9, 2006.

U.S. Patent and Trademark Office Non-Final Office Action, received for U.S. Appl. No. 10/821,366, mailed Sep. 20, 2005.

* cited by examiner

Fig. 1

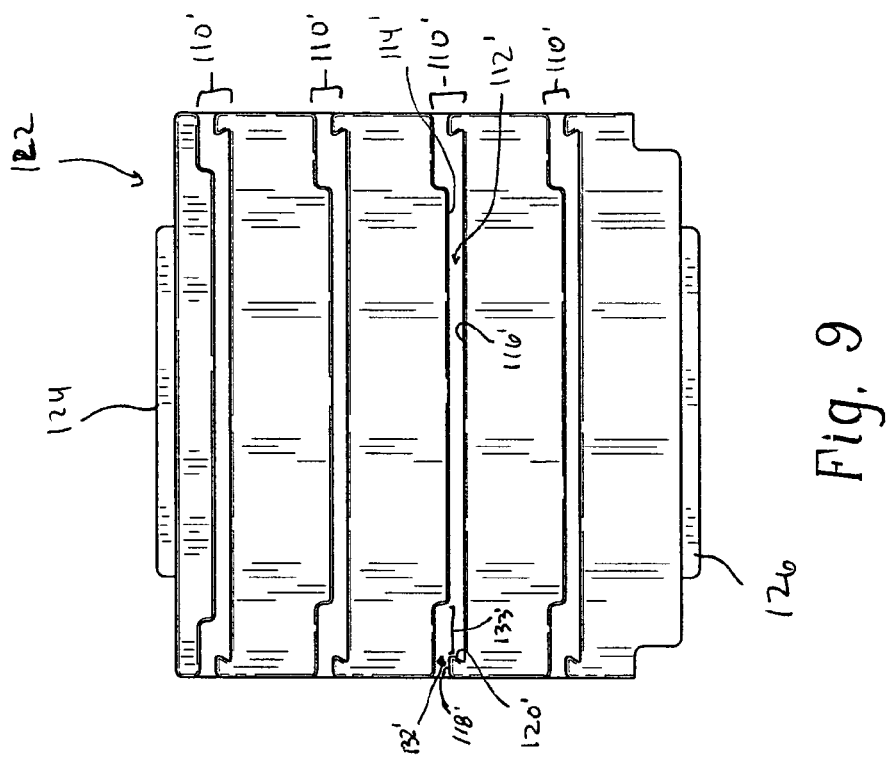
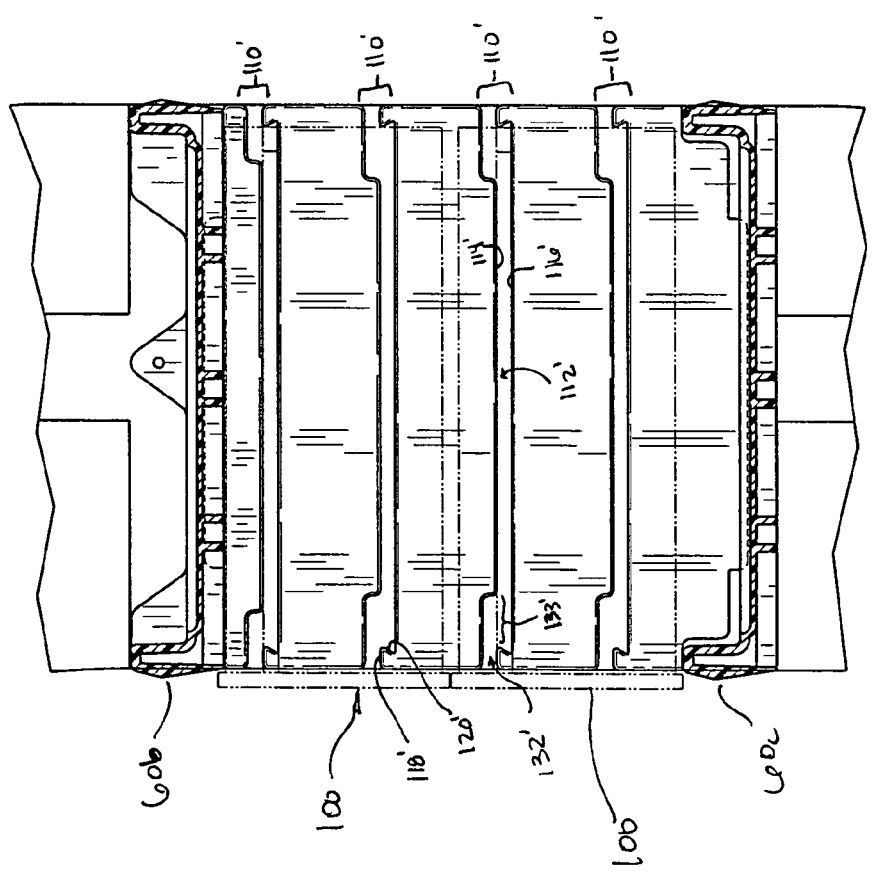

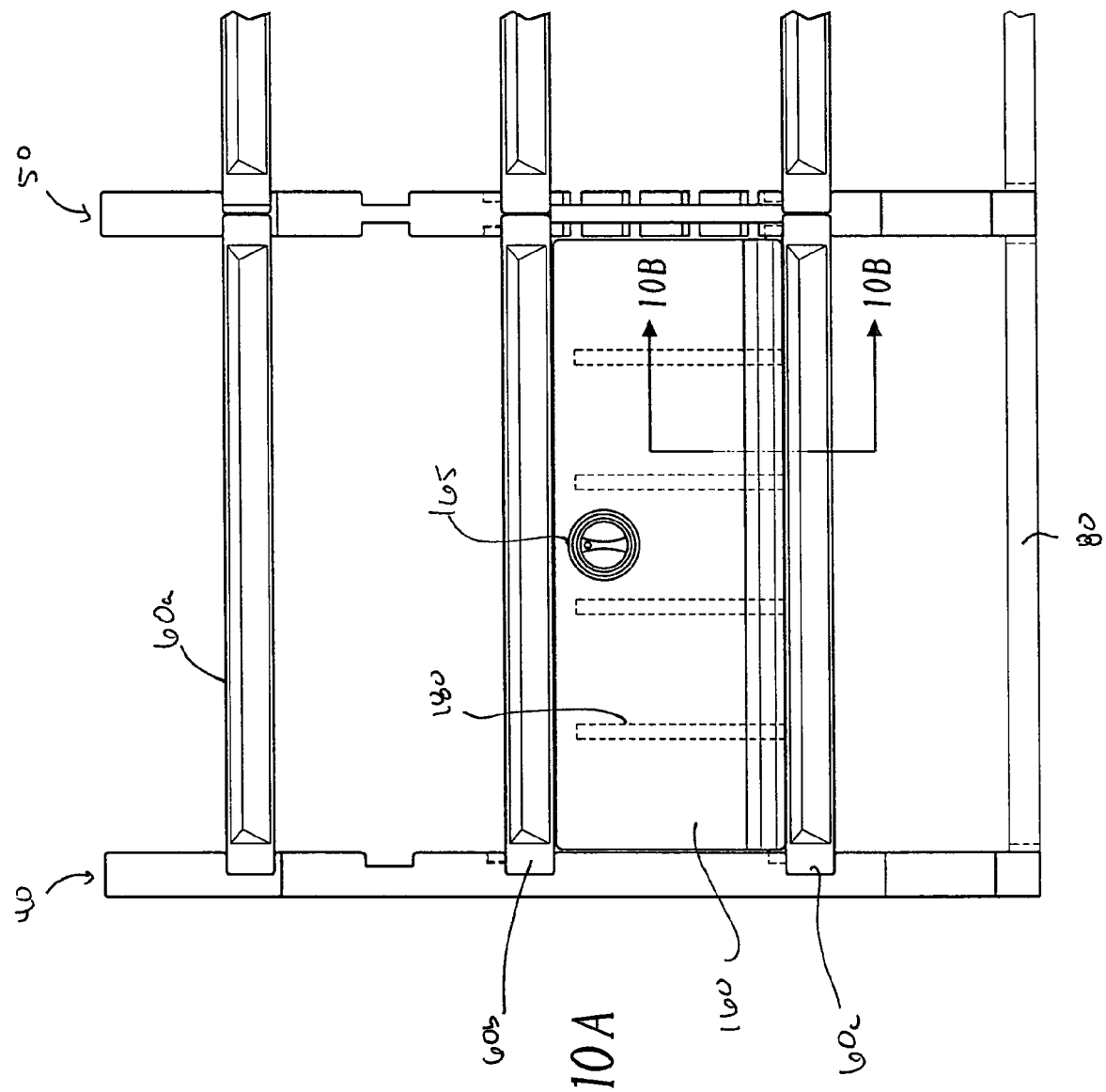

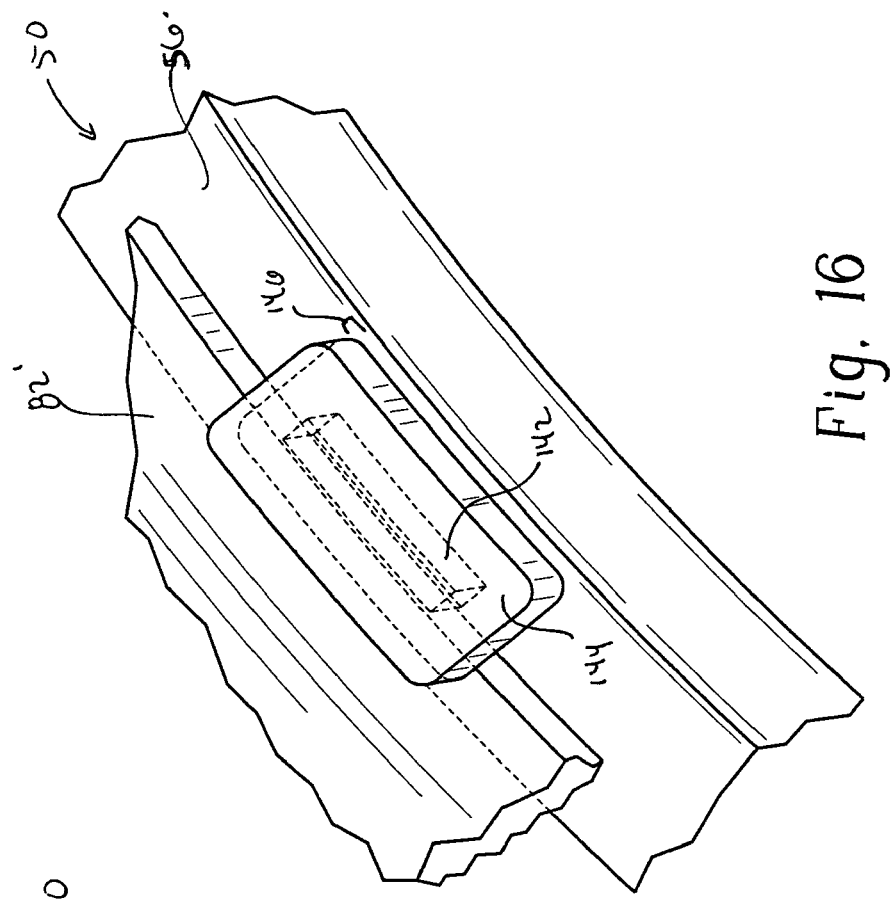
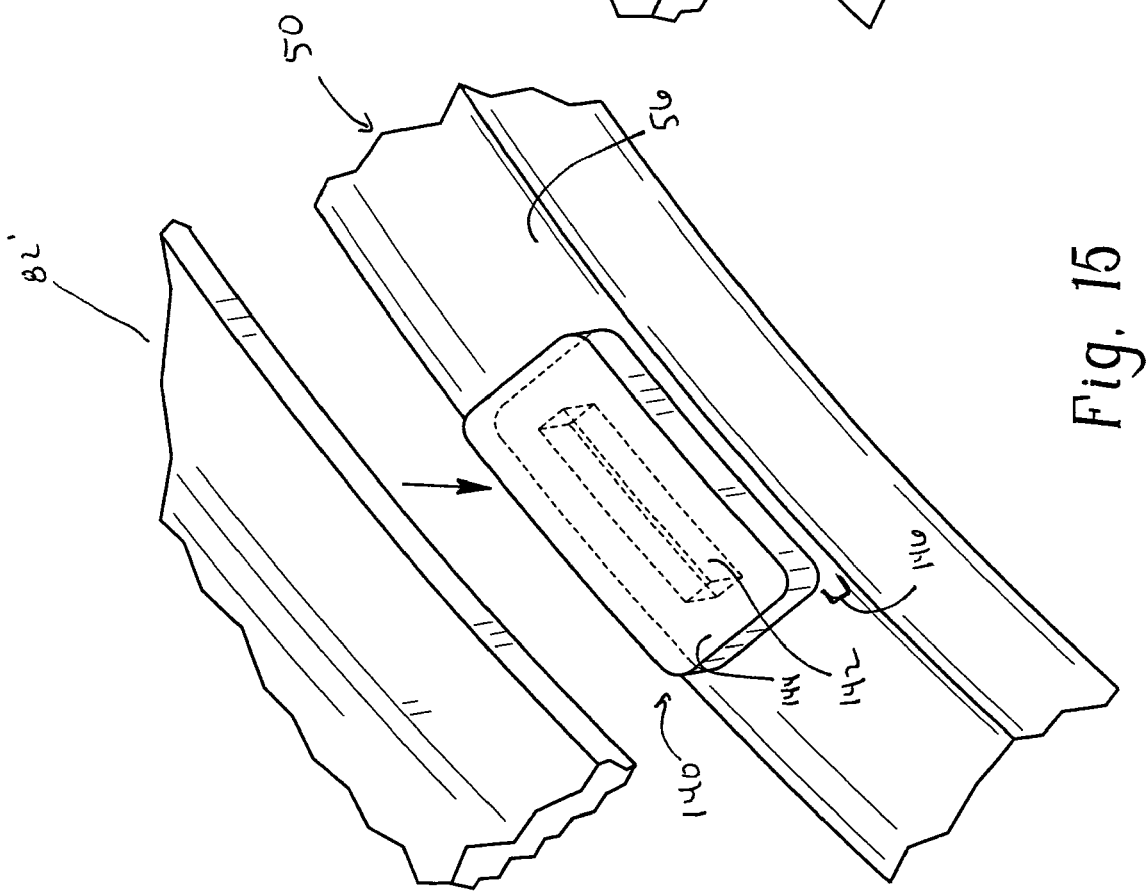
Fig. 15
Fig. 16

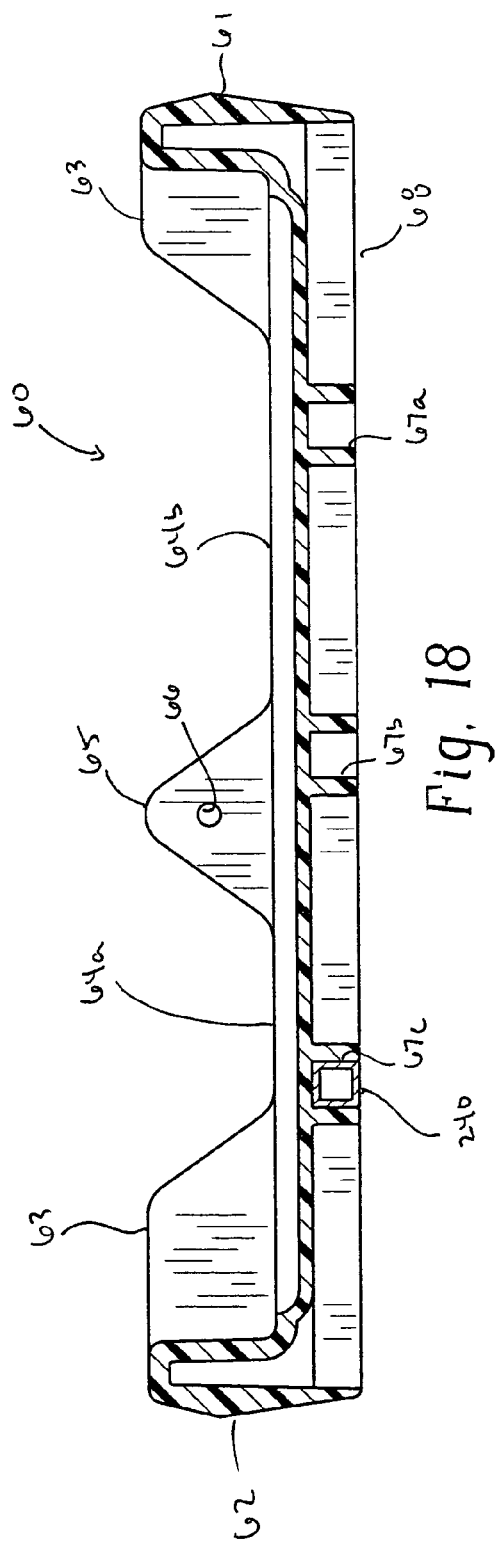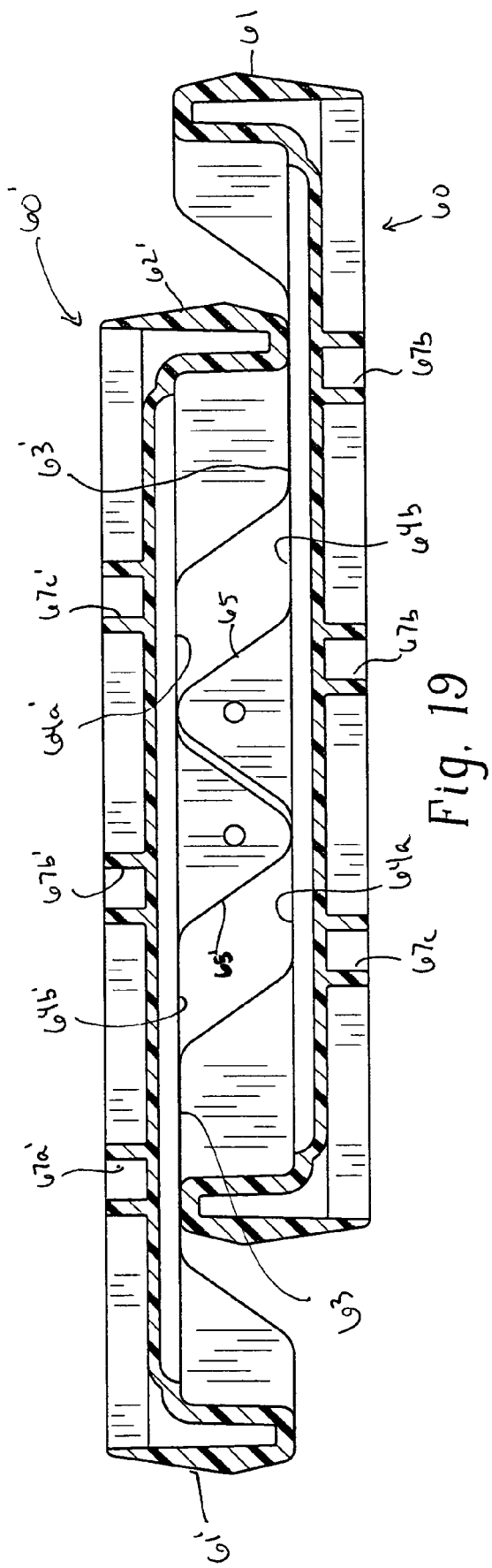

ADJUSTABLE SHELVING AND STORAGE SYSTEM FOR VEHICLES

BACKGROUND

The present disclosures relates to a storage system for vehicles. More specifically, the present disclosure relates to a modular storage system for use in vehicles. It finds particular application in conjunction with vehicles such as, for example, cargo vans and the like, and will be described with particular reference thereto. It is to be appreciated, however, that the present exemplary embodiment is also amenable to other like applications.

BRIEF DESCRIPTION

Service professionals, e.g., plumbers, contractors, cable or telephone installers, electricians, etc., are commonly required to carry in their vehicles a large number and variety of tools, parts, equipment, and the like necessary to perform their work. The tools, parts, equipment, etc., can range from large or bulky tools or large spools of cable to smaller tools, fasteners, spare parts, etc. As such, it is known to equip service vehicles with storage units to house items of various sizes.

Many of the storage units known in the art are steel units that include steel end panels, a back panel and steel shelving. The shelves of these storage units are essentially tray structures having a bottom and four sides extending perpendicular from and perpendicular to the bottom. The shelves are fitted between the two end panels adjacent the back panel to provide a storage unit. The shelves are held in position by connecting the shelves directly to each of the end panels and the back panel. The shelves may be held in position by welding the sides of the shelves to the end panels and the back panel or by mechanical fasteners connecting the shelves to each of the end and back panels through the sides of the shelves.

There are several disadvantages associated with these known storage units. Storage units known in the art are essentially as-is structures that are not easily reconfigurable or adjustable. It may be advantageous or even necessary for a worker to house an item in the vehicle for which no space currently exists. Therefore, it would be beneficial for the worker to be able to reconfigure the storage system in his vehicle by moving, adding or removing shelving, drawers, etc. Shelves that are welded to the end and back panels are not removable (or, at least, not easily removed). In the storage unit described above, shelves or drawers are connected to both back panels and the end panels and therefore cannot be adjusted or reconfigured without either completely removing the unit from the vehicle or unmounting the end panels and back panel.

Additionally, several disadvantages are associated with the all steel construction of the storage units. First, the all steel construction may create a noisy environment. When empty, the steel units are prone to rattling during the operation of the vehicle. The noise level may be increased when the units are filled with various equipment including metal tools or parts. Second, the all steel units can be rather heavy, and added weight to a vehicle may increase fuel consumption for operation of the vehicle and increase the cost to operate the vehicle.

Therefore, there is a need for a storage system and storage units for vehicles that are modular, reconfigurable, and/or customizable by the user. Further, there is also a need for a storage unit or system for vehicles wherein the means for adjusting or reconfiguring the system is easily accessible to the user. Additionally, there is also need for a storage system that is lighter in weight compared to conventional storage units.

SUMMARY OF THE INVENTION

The disclosure provides in various embodiments thereof, a modular storage system for a vehicle having a front, a back, a curb-side, and a street-side, the storage system comprising a first support panel having a top, a bottom, a front edge, a rear edge, a first surface, and a second surface, the second surface comprising one or more shelf support means disposed between the front and rear edges of the second surface of the first panel; a second support panel having a top, a bottom, a front edge, a rear edge, a first surface oriented toward the second surface of the first panel, and a second surface, the second panel disposed generally parallel to the first panel and comprising one or more shelf support means disposed between the front and rear edges of the first surface of the second panel and opposite the shelf support means of the first panel; and a shelf dimensioned for removable receipt between the first and second panels, the shelf being supported by the shelf support means, wherein the first panel, the second panel, and the shelf are formed from a polymer material.

The disclosure also provides, in various embodiments thereof, a modular storage unit for a vehicle having a front, a back, a curb-side, and a street-side, the storage unit comprising (a) a first panel having a top, a bottom, a front edge, a first surface, and a second surface opposite the first surface, the second surface comprising at least one channel recessed relative to the second surface and horizontally disposed between the front and rear edges of the first panel; and (b) a second panel generally parallel and opposite the first panel, the second panel having a top, a bottom, a front edge, a rear edge, a first surface, a second surface, the first surface of the second panel being oriented toward the second surface of the first panel, and at least one shelf support channel recessed relative to the first surface of the second panel and horizontally disposed between the front and rear edges of the second panel; wherein the first panel and the second panel comprise a polymer material.

Additionally, the disclosure provides, in various embodiments, a kit for forming a modular storage system for a vehicle comprising a plurality of panels having a top, a bottom, a first surface, a second surface, a front edge, and a rear edge, at least one of the first and second surfaces of the panels comprising one or more shelf support means horizontally disposed between the front and rear edges of the panels for receiving a shelf.

The disclosure also provides, in various embodiments thereof, a modular storage unit for a vehicle having a front, a back, a curb-side, and a street-side, the storage unit comprising (a) a first panel having a top, a bottom, a front edge, a first surface, and a second surface opposite the first surface, the second surface comprising at least one drawer slide channel recessed relative to the second surface and horizontally disposed between the front and rear edges of the first panel; and (b) a second panel generally parallel and opposite the first panel, the second panel having a top, a bottom, a front edge, a rear edge, a first surface, a second surface, the first surface of the second panel being oriented toward the second surface of the first panel, and at least one drawer slide channel recessed relative to the first surface of the second panel and horizontally disposed between the front and rear edges of the second panel, the drawer slide channels dimensioned for receiving a drawer; wherein the first panel and the second panel comprise a polymer material.

The disclosure also provides, in various embodiments thereof, a modular storage system for a vehicle having a front, a back, a curb-side wall, and a street-side wall, the storage system comprising (i) a first storage unit disposed along the curb-side wall, the first storage unit comprising (a) a first support panel having a top, a bottom, a front edge, a rear edge, a first surface, and a second surface, the second surface comprising one or more shelf support means disposed between the front and rear edges of the second surface of the first panel; and (b) a second support panel having a top, a bottom, a front edge, a rear edge, a first surface oriented toward the second surface of the first panel, and a second surface, the second panel disposed generally parallel to the first panel and comprising one or more shelf support means disposed between the front and rear edges of the first surface of the second panel and opposite the shelf support means of the first panel; and (ii) a second storage unit disposed along the street-side wall, the second storage unit comprising (a) a third support panel having a top, a bottom, a front edge, a rear edge, a first surface, and a second surface, the second surface comprising one or more shelf support means disposed between the front and rear edges of the second surface of the third panel; and b) a fourth support panel having a top, a bottom, a front edge, a rear edge, a first surface oriented toward the second surface of the third panel, and a second surface, the fourth panel disposed generally parallel to the third panel and comprising one or more shelf support means disposed between the front and rear edges of the first surface of the fourth panel and opposite the shelf support means of the third panel; and wherein the support panels are formed from a polymer material.

BRIEF DESCRIPTION OF THE DRAWINGS

FIG. 1 is a perspective of the cargo bay of a vehicle containing adjustable shelving systems with one swung away from its normal position for clarity;

FIG. 8 is a cross sectional view of the storage unit in FIG. 4 taken along the line 8-8 showing a center drawer mounting system disposed between two (2) shelves;

FIG. 9 is a side elevational view of the center drawer mounting system in FIG. 8;

FIG. 10A is a front plan view of a storage unit with a door between the middle and bottom shelves of the storage unit;

FIG. 15 is a detail showing a retainer means for positioning a back panel on an intermediate panel;

FIG. 16 shows the positioning of a back panel and the retainer means of FIG. 15;

FIG. 18 is a cross sectional side view of a shelf;

FIG. 19 is a cross sectional side view of two (2) shelves in a nesting configuration;

DETAILED DESCRIPTION

Figure 2:
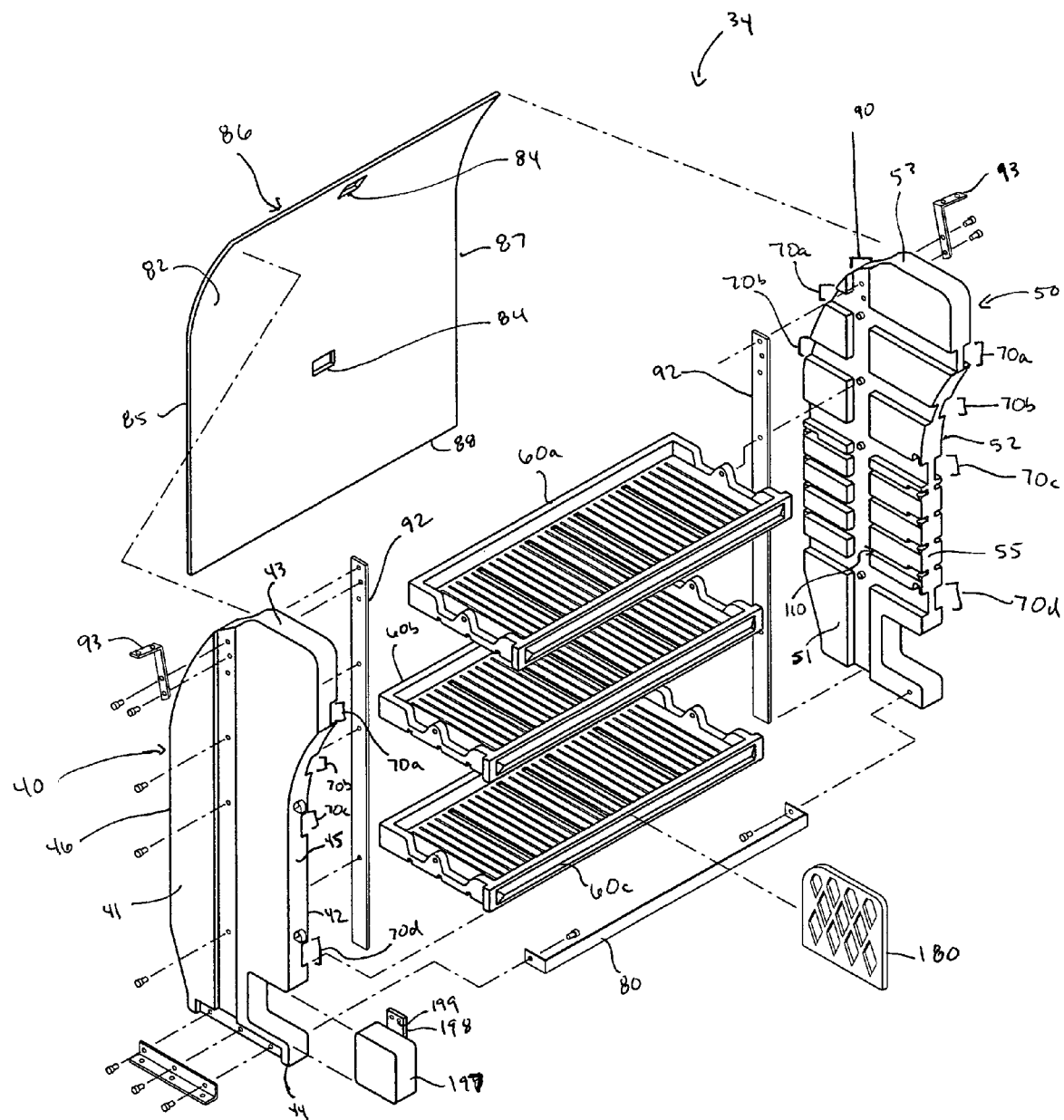
FIG. 2 is an exploded view of one segment of the shelving system depicted on the left hand side of the vehicle in FIG. 1.

The present disclosure relates, in various embodiments thereof, to a modular storage system for a vehicle and modular storage units that form or make-up the storage system. The storage system and storage units are particularly suitable for use in a vehicle such as a van, cargo van, truck, or the like.

Vehicles such as vans, commercial vans, cargo vans, trucks, and the like include a forward section, a back section, a longitudinal center line, a street-side and a curb-side. Using the American convention for driving, the area left of the longitudinal center line of the vehicle is referred to as the street-side and the area right of the longitudinal center line of the vehicle is referred to as the curb-side. The terms "street-side" and "curb-side" are merely used for purposes of convenience. It will be appreciated that items defined as a street-side item or a curb-side item can be switched along the longitudinal center line of the vehicle without departing from the scope of the disclosure.

Generally, a storage system in accordance with the present disclosure comprises one or more individual storage units, wherein the individual storage units are formed by opposing, generally vertical or upright, panels. The general upright or vertical panels are also referred to herein as support panels. One or more shelves, or one or more drawers, may be disposed between the panels. The major components of a storage unit, i.e., the panels, the shelves, and/or the drawers, are formed from non-corrosive or polymeric materials. The panels include a means for supporting the shelves and/or the drawers. The shelf support or drawer support means may be integral with and molded as part of the upright panels.

Figure 1:
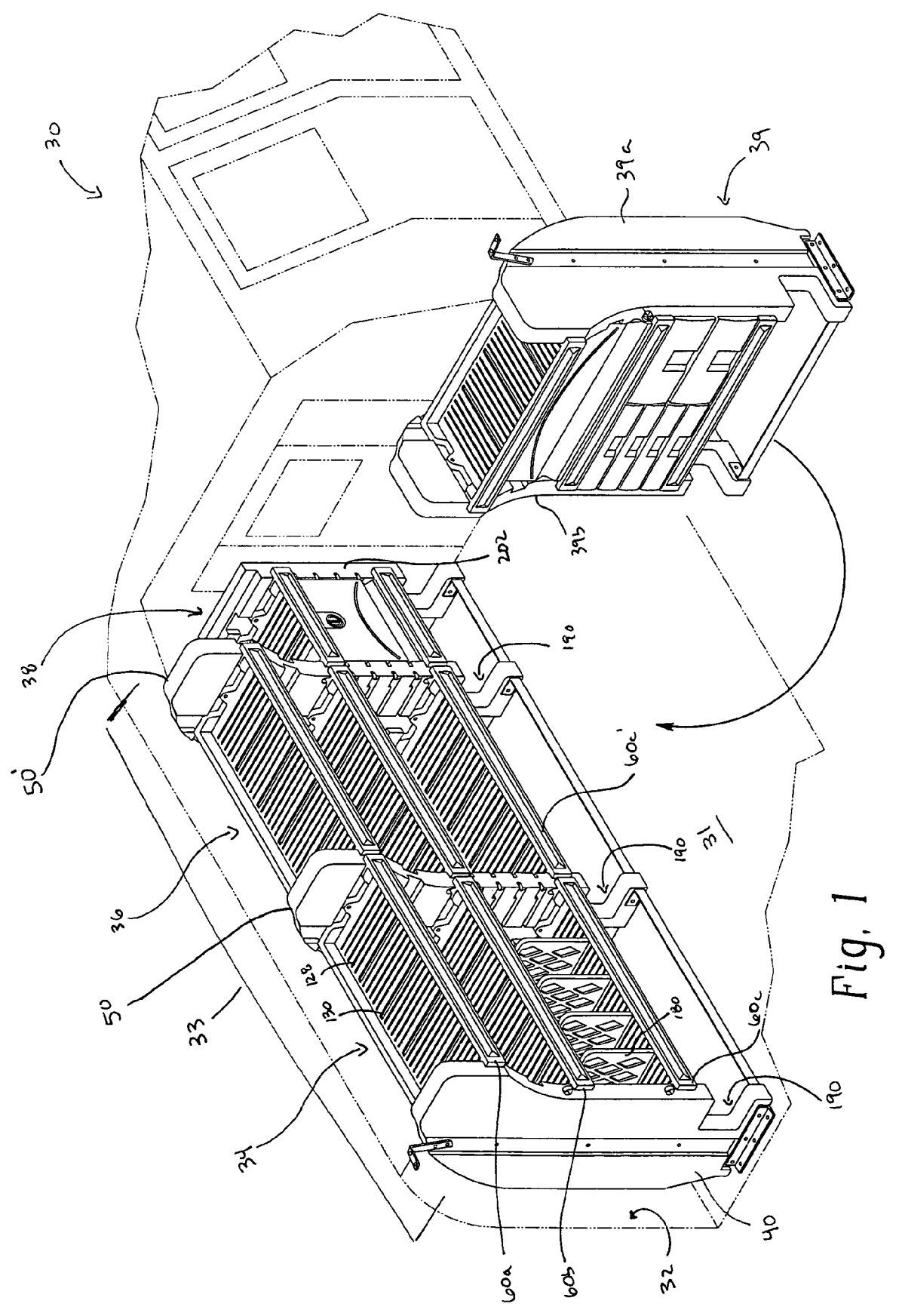

With reference to FIG. 1, a vehicle 30, such as a van, includes a cargo bay 31 with storage system 33 adjacent street-side wall 32 and storage system 39 adjacent the opposite (curb-side) wall. Storage system 33 comprises individual storage units 34, 36, and 38. Storage unit 34 is formed from upright panel 40 and upright panel 50, which may include one or more shelves, such as shelves 60a, 60b, and 60c, disposed between panels 40 and 50. Storage unit 36 is formed from upright panel 50 and upright panel 50', which may include one or more shelves or one or more drawers disposed between panels 50 and 50'. Storage unit 38 is a cubby unit formed from upright panel 50' and a cubby panel 202.

With reference to FIG. 2, storage unit 34 of storage system 33 is shown. Generally, storage unit 34 includes a pair of opposing panels 40 and 50 having one or more shelves removably disposed between the panels. Panels 40 and 50 may be releasable connected to one another by one or more connecting members such as, front connecting member 80 and/or back panel 82.

Panels 40 and 50 each include a first surface 41 and 51, respectively, a second surface 42 and 52, respectively, a top 43 and 53, respectively, a bottom 44 and 54, respectively, a front edge 45 and 55, respectively, and a back edge 46 and 56, respectively. For purposes of convenience, the first surfaces of the panels are described as being oriented toward the back of the vehicle, and the second surfaces of the panels are being described as oriented toward the front of the vehicle. The panels 40 and 50 may be positioned adjacent a side wall of the vehicle, and are oriented opposite and generally parallel to one another. As show in FIG. 2, the second surface 42 of panel 40 faces the first surface 51 of panel 50. The second surface 42 of panel 40 is a mirror image of the first surface 51 of panel 50. By the previously described convention, in a storage system comprising more than two upright panels, the second surface of one panel faces the first surface of the next successive panel.

Figure 3:
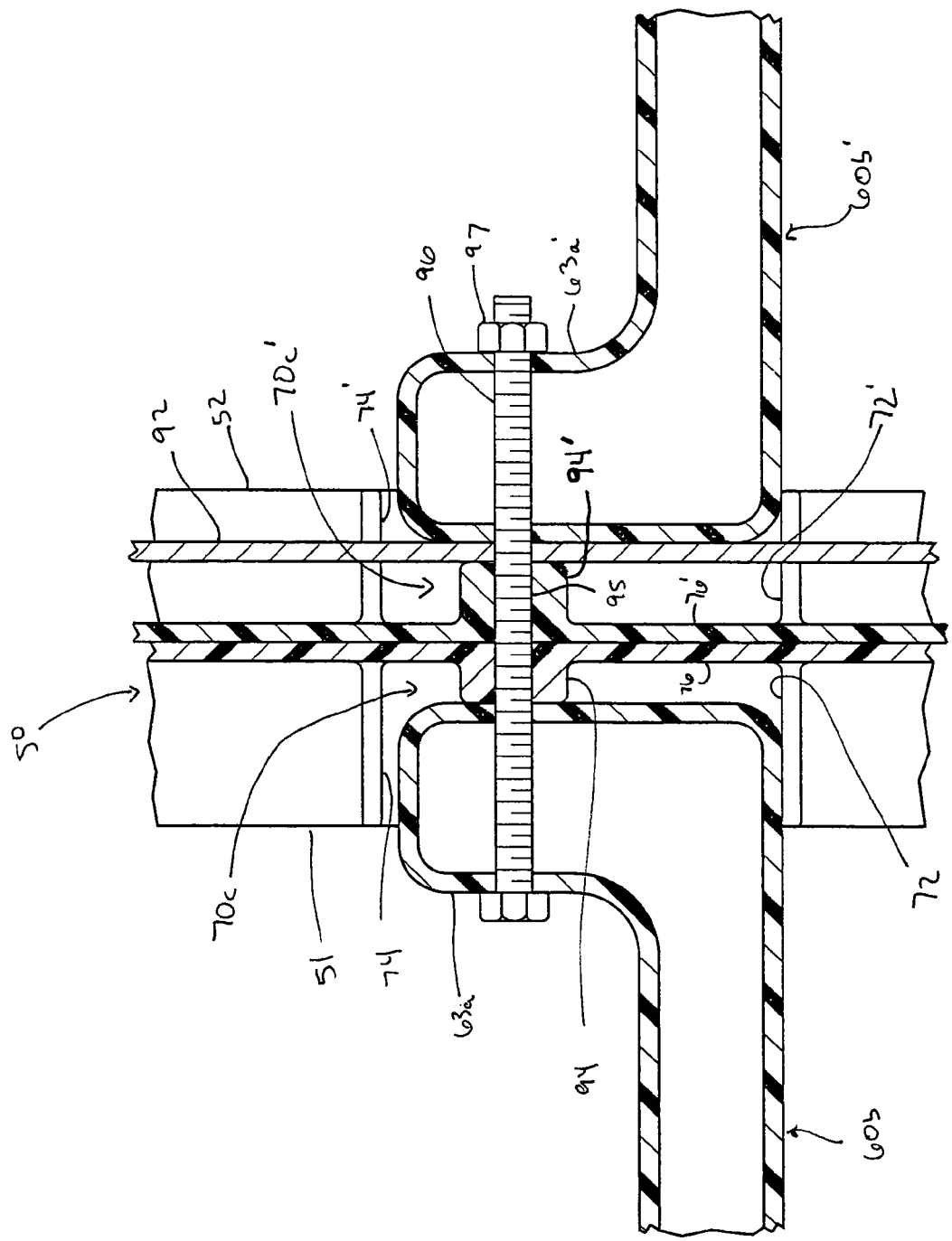
FIG. 3 is an enlarged cross sectional view of a portion of a vertical panel of a storage unit and supported adjacent shelves on either side of the panel.

Storage unit 34 contains shelves 60a, 60b, and 60c, disposed between panels 40 and 50. Panels 40 and 50 include one or more shelf support means, e.g., 70a, 70b, 70c, and 70d integral with faces 42 and 51 of panels 40 and 50 respectively. As shown in FIG. 2 and FIG. 3, the shelf support means in panels 40 and 50 are channels 70a, 70b, 70c, and 70d, each having a generally horizontal lower surface and a generally horizontal upper surface extending from the front of the panels to the back of the panels. The channels are dimensioned to receive a shelf, such as, for example, one of shelves 60a, 60b, or 60c, with the bottom of a shelf being supported by the lower surfaces, such as, for example, lower surfaces 72, 72' (FIG. 3), of the respective channels.

With reference to the embodiments in FIGS. 1 and 2, the shelves such as shelves 60a, 60b, and 60c, are positioned between panels 40 and 50, and supported by shelf support means such as channels 70a, 70b, 70c, and/or 70d. As shown in FIG. 3, the bottom of a shelf, such as shelves 60b and 60b' is (are) supported by the lower surface of a channel, such as for example, lower surfaces 72 and 72' of channels 70c and 70c', respectively.

A panel may optionally include shelf support means on both the first and second surfaces of the panel. For example, as depicted in FIGS. 1, 2, and 3, panel 50 includes shelf support means along each of the first and second surfaces of the panel. In one embodiment, such as that shown in FIGS. 1, 2, and 3, the first and second surfaces of a panel are mirror images of each other such that the shelf support means are positioned at the same vertical height within the panel. Thus, as shown in FIGS. 1 and 3, a panel such as panel 50 may support one or more shelves on each side of the panel. Panels having shelf support means along both (upright) surfaces provides some of the modularity to a shelving unit/system. In particular, a panel that can accommodate shelves or drawers on both sides allows an additional storage or shelving unit to be added such that the storage system may be expanded.

Further, the use of such panels allows adjacent storage units, such as units 34 and 36 in FIG. 1, to share an upright panel, which allows for reducing the number of parts used or needed to create a storage system. This may be beneficial to reduce the cost to create a system. A system with fewer parts should also have a reduced weight.

The shelves may optionally be releasably attached to the end panel to further secure or maintain the shelf in its position between the panels. The panels may also be releasably attached to a panel by fasteners, screws bolts, and the like via apertures or bores in the panels. A panel capable of supporting a shelf at the same vertical height on each surface of the panel may include an aperture or bore extending through the first and second surfaces of the panel. The aperture or bore is adapted to receive a fastener extending through one side wall of a shelf positioned on one side of the panel, through the apertures and through the side wall of a shelf supported along the second surface of the panel. For example, with reference to FIG. 3, panel 50 includes shelf support means 70c recessed relative to first surface 51 and shelf support 70c' recessed with respect to second surface 52. Shelf 60b is supported by lower surface 72 of channel 70c, and shelf 60b' is supported by lower surface 72' of channel 70c'. Channels 70c and 70c' further include vertical walls 76 and 76', respectively. Vertical walls 76 and 76' include bosses 94 and 94' having an aperture 95 extending therethrough. Fastener 96 is positioned through an aperture in side wall 63a of shelf 60b, through aperture 95, through an aperture of side wall 63b' of shelf 60b'; and secured with a tightening nut 97.

A shelf support means includes any aperture or channel adapted to receive a portion of a shelf. The size and shape of the shelf support means may be selected as desired for a particular purpose or intended use. The shelf support means may be channels, such as channels 70a-70d in FIG. 2, that extend from the front of a panel to the back of a panel. In other embodiments, the shelf support means is a channel having an opening along the front edge of the panel such that a shelf may be positioned between two panels or removed therefrom by sliding the panel along the channel from the front of the panels. A shelf support means that is an elongated channel extending from the front of a panel may extend the full distance between the front and back of a panel (as shown in the embodiment in FIG. 2). In another embodiment, a shelf support channel may have a terminal end adjacent the back of a panel. A terminal end may act as a stop when positioning a shelf in such a shelf support means.

In still other embodiments, a shelf support means may include a channel adapted to receive a shelf wherein the channel does not fully extend to either the front or the back of a panel. In such embodiments, a shelf may be positioned, such as by snap-fitting the shelf into the channel.

In further embodiments, a shelf support means may comprise a ledge extending from a surface of a support panel. A ledge may be integrally molded as part of a support panel. In one embodiment, a shelf support means on a given panel may comprise a generally continuous ledge extending between a front surface and a back edge of a support panel. A generally continuous ledge may extend substantially the entire distance between the front and back edge or it may have a length less than the distance between the front and back edge of a support panel. In other embodiments, a shelf support means on a given panel may comprise a plurality of ledges disposed at generally the same vertical height so as to define a generally horizontal surface for supporting a shelf. The shape, size, length, and number of ledges used to form a shelf support means is not critical and may be selected as desired for a particular purpose or intended use.

In other embodiments, a shelf support means includes one or more apertures adapted to receive a corresponding projection on a shelf. Or, in the alternative, a shelf support means may comprise a projection on a surface of a support panel adapted to mate with a corresponding aperture on a shelf. In such embodiments, a shelf may be positioned by, mating the apertures and projections (such as by, for example, snap-fitting). The shape, size, and number of the apertures and projections is not critical and may be selected as desired for a particular purpose or intended use.

In an exemplary embodiment, a shelf support means is a channel having an opening along the front of a panel such that a shelf may be easily slid into or out of the shelf support channel. This allows for quicker reconfiguration of a shelving unit or system and may not require removal or movement of the support panels to reconfigure a storage unit or system.

In other embodiments, a given shelf support means in one panel is positioned at the same vertical height of a shelf support means in the opposing face of the next successive panel such that opposing shelf support means lie in the same horizontal plane. The number, location, size and shape of the shelf support means is not limited and may be chosen to accommodate a particular vehicle or intended use. In other embodiments, the shelf support means in all panels, or within an individual unit may be identical. Additionally, opposing faces of successive panels may be mirror images of one another.

The support panels may include other apertures or channels as desired for a particular purpose or intended use. For example, and with reference to FIG. 2, the support panels may include a vertical slot or channel, 90, adapted to receive a vertical member 92, or support member. Vertical member 92 may be used to provide further support to the support panels such as panels 40 and 50. In one embodiment, the vertical member 92 is made from a metal material and includes one or more apertures such that the vertical member may be releasably connected or attached to the upright support panels such as panels 40 or 50. As shown in FIG. 2, the apertures of the vertical member 92 may be located or positioned to correspond with apertures of connecting member 93 that serves as a means for attaching a panel to the wall or ceiling of the vehicle. In this way, a fastener that connects connecting member 93 with a panel such as panel 40 extends through apertures in panel 40 and through the corresponding apertures in vertical member 92 so as to provide a metal-to-metal contact in attaching the panel to the vehicle.

The vertical members 92 are not limited in any manner and may be shaped and sized for a particular purpose or intended use. For example, the vertical member may extend the full height of the panel, or may have a height that is less than the full height of the panel. The vertical member may be any shape as desired for a particular purpose or intended use including, but not limited to, rectangular, a cylinder, quonset-shaped, and the like.

Additionally, the panels may include means for supporting one or more drawers between successive upright support panels. The drawer slide means may be formed as part of the support panels, i.e., integral with the surface(s) of the support panels, or provided via separate pieces such as is described in co-pending U.S. patent application Ser. No. 10/821,366, the entire disclosure of which is incorporated herein by reference. Drawer slide means that are integral with a panel may include projections or recessed grooves generally extending between the front and back of a panel. Drawer slide means formed from recessed grooves will generally define an opening at the front of the panel dimensioned for receiving a drawer.

Figure 4:
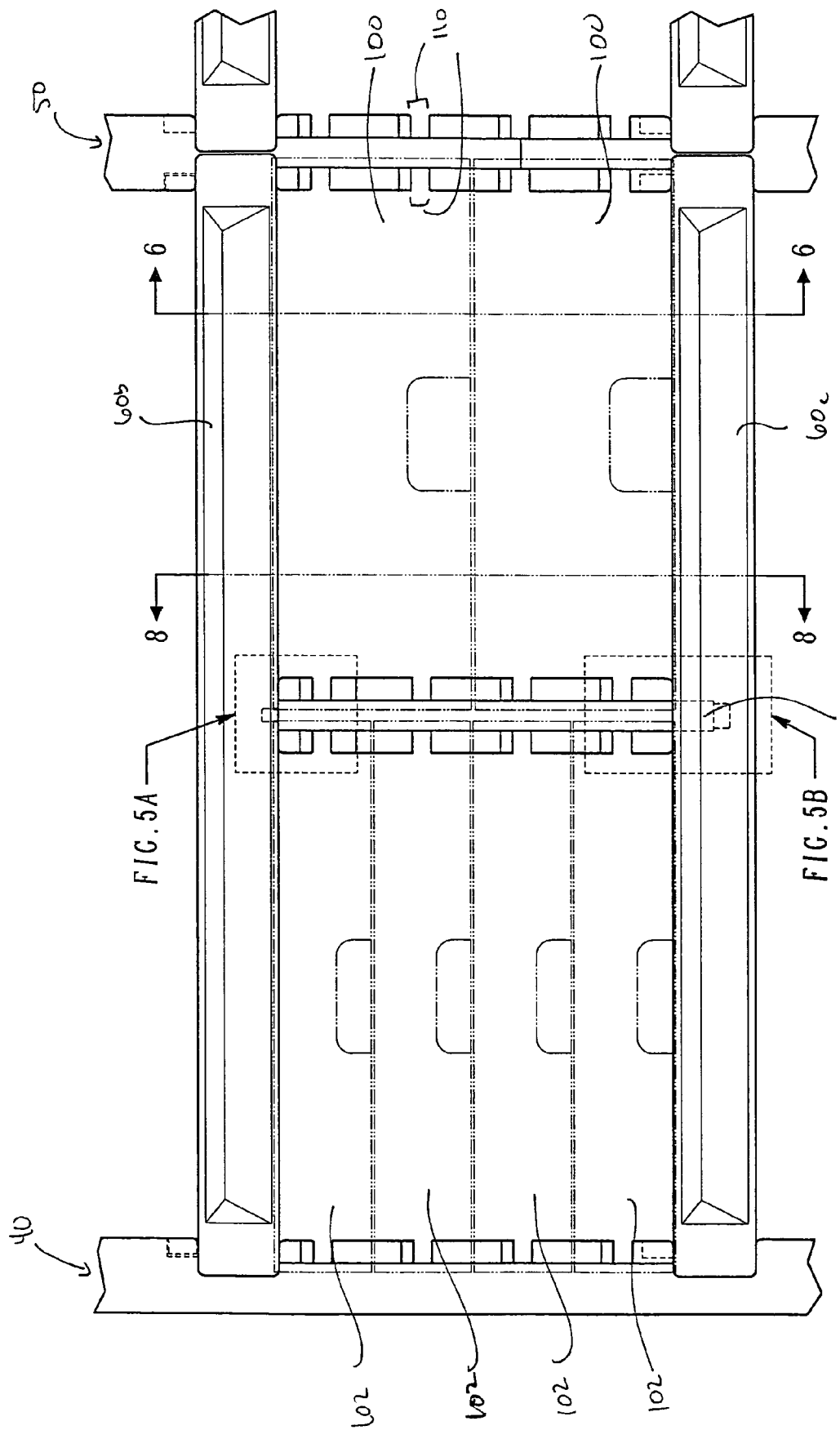
FIG. 4 is a front plan view of a portion of a storage unit having a number of drawers, the drawers being shown in phantom.
Figure 5A:
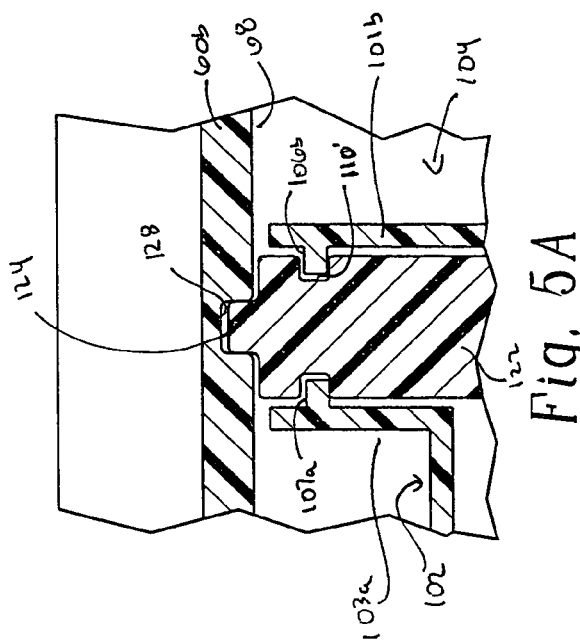
FIG. 5A is an enlarged cross sectional view of the upper portion of the center drawer mounting system in FIG. 4.
Figure 5B:
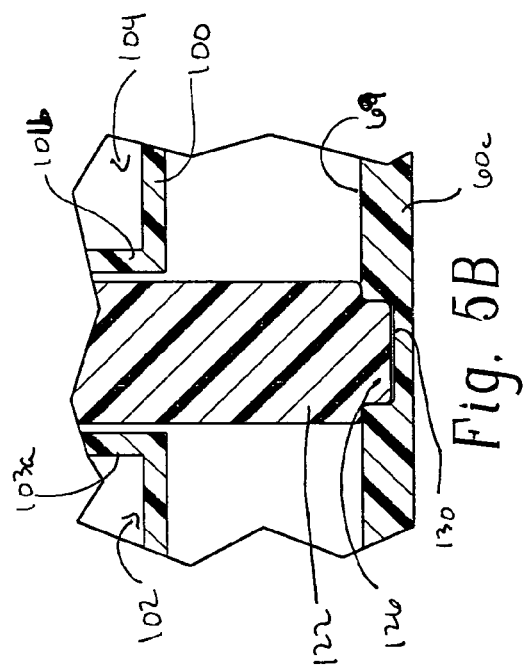
FIG. 5B is an enlarged cross sectional view of the lower portion of the center drawer mounting system in FIG. 4.
Figure 6A:
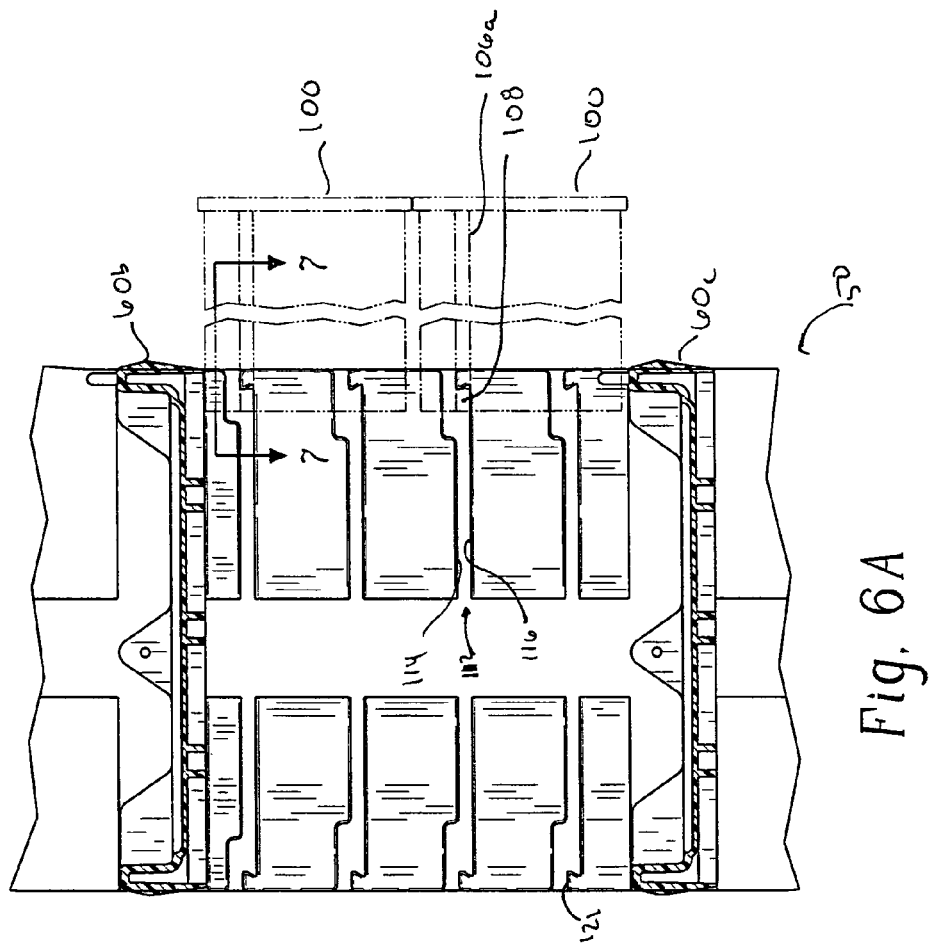
FIG. 6A shows the view of FIG. 6 with the drawers in an open position.
Figure 6:
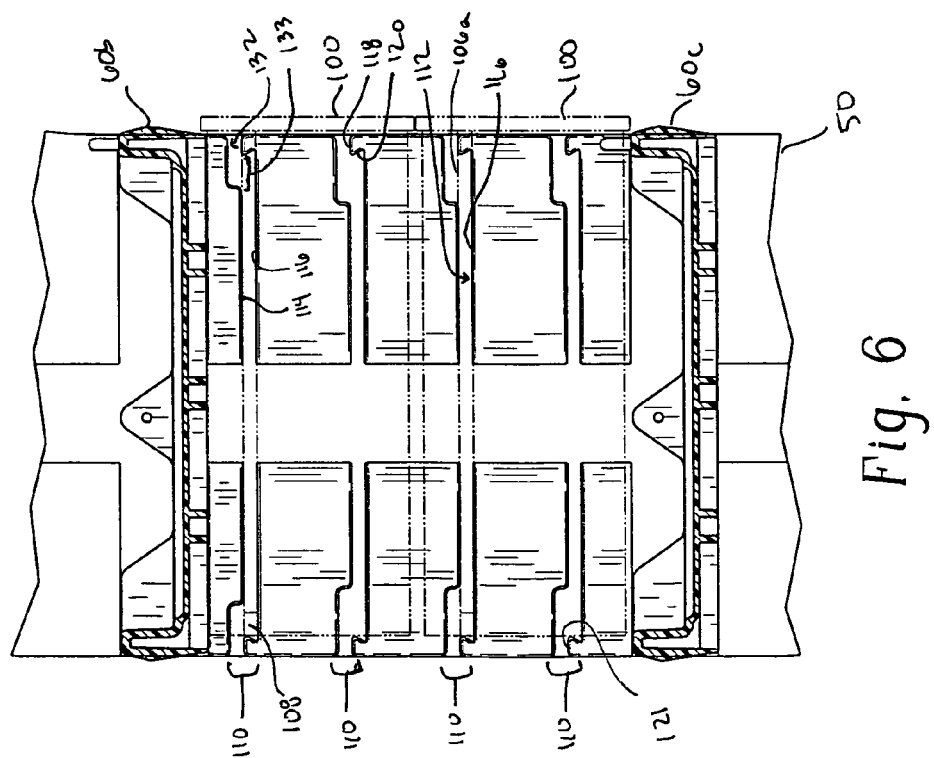
FIG. 6 is a cross sectional view of the storage unit of FIG. 4 taken along the lines 6-6 showing the drawers in a closed position.

In the several embodiments shown in FIGS. 1, 2, and 4-9, the panels comprise drawer slide means that are integral with at least one surface of the panels. The drawer slide means generally include recessed channels. The drawer slide means may be configured (as shown in FIGS. 1, 2 and 4-9) in a manner similar to the drawer slide configuration described in U.S. patent application Ser. No. 10/821,366. With reference to FIG. 4, an embodiment of storage unit 34 is shown that includes large drawers 100 and small drawers 102 disposed between panels 40 and 50. As shown in FIGS. 2 and 4, panels 40 and 50 may comprise one or more drawer slide means 110 adapted to slidably receive a drawer. Drawer slide means 110 are integral with panels 40 and 50 and recessed relative to first and second surfaces thereof, respectively. With reference to FIGS. 6 and 6A, drawer slides 110 comprise a channel 112 having a lower surface 116 and an upper surface 114. Channel 112 is adapted to receive a portion of a shelf in sliding engagement with lower surface 116 and/or upper surface 114. The number, location, shape, and size of the drawer slide means 110 may be selected as desired for a particular purpose or intended use. As previously described, the opposing faces of successive panels are preferably mirror images of one another and thus, in embodiments comprising one or more drawer slides, drawer slides on opposing faces of successive panels are preferably positioned at the same vertical height on the panel.

In one embodiment, the panels are adapted to receive one drawer slidably positioned between opposing drawer support means. In another embodiment, a drawer slide post, such as post 122, may be positioned between adjacent panels, such as panels 40 and 50. Post 122 (FIGS. 4, 5A, 5B, 8, and 9) includes drawer slide means 110' on each vertical surface of the post to allow drawers to be positioned between panel 40 and post 122 and between panel 50 and post 122 as seen in FIG. 4. The top and bottom of post 122 comprise protrusions 124 and 126 respectively. The protrusions may be knob-like protrusions of various shapes or elongated members of various shapes. The post may be positioned between panels 40 and 50 by inserting protrusions 124 into a slot, recess, or grove 128 in the bottom surface 68 of shelf 60b and inserting protrusion 126 into slot, recess, or grove 130 in the upper surface 69 of shelf 60c (FIGS. 5A and 5B). The protrusions are shaped to correspond to the shape of the slot, recess, or grove into which the protrusions are inserted. The protrusions may be sized such that the protrusions are slightly smaller than the slot, recess, or grove so that the protrusion may be snugly fitted into the slot, recess, or grove, such as, for example, by snapping the protrusion into the slot, recess, or grove.

Figure 7:
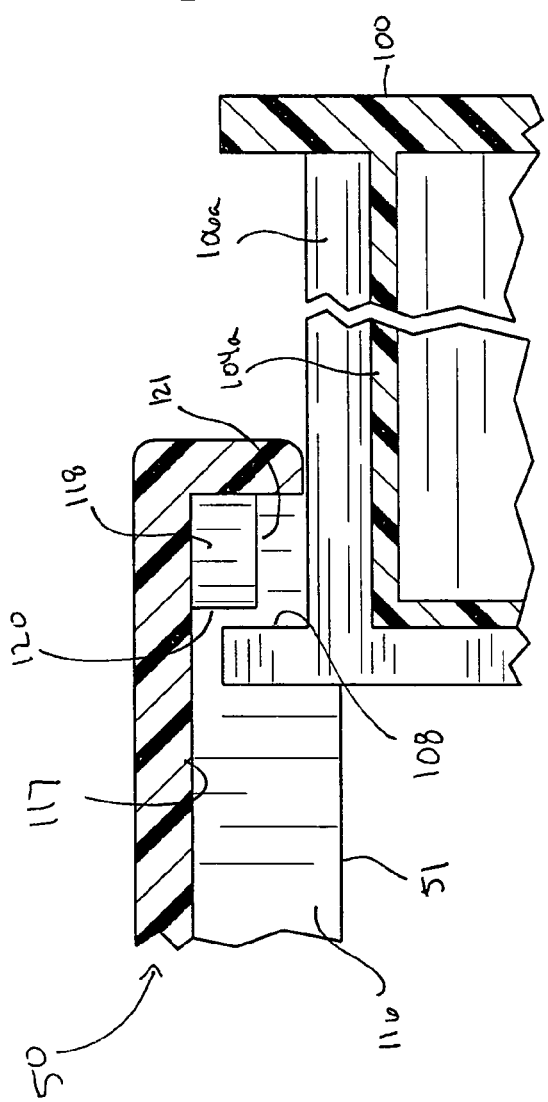
FIG. 7 is an enlarged cross sectional view of the drawer slide in FIGS. 6 and 6A taken along line 7-7.

With reference to FIGS. 5A, 5B, and 7, drawers 100 and 102 have outer walls 101a and 101b, and 103a and 103b, respectively. Drawers 100 and 102 further include flanges 106a and 106b, and 107a and 107b, respectively, substantially perpendicular to outer surfaces of outer walls 101a/101b and 103a/103b, respectively. As show in FIGS. 5A, 5B, and 7, flanges 106a/106b and 107a/107b are integral with the outer surfaces of the respective drawer walls. Channels 112, (FIGS. 6 and 6A) and 112' (FIGS. 8 and 9) of drawer support means 110 and 110', respectively, are adapted to receive flanges 106a/106b and 107a/107b respectively. The flanges 106a/106b and 107a/107b are slidable along the lower surface 116 and 116' of channel 112 and 112', respectively.

In one embodiment, the drawer slides may be configured to provide a stop so that the drawer may not be pulled out beyond a particular point. With reference to FIGS. 6, 6A, and particularly 7, a portion of panel 50 is shown depicting shelf support means 110 (FIG. 6) having channels 112 defined by upper surface 114 and lower surface 116. The discussion with respect to the drawer support means 110 on panels 40 and 50 is applicable to drawer support means 110' on post 122 as depicted in FIGS. 8 and 9. For ease of discussion reference will be made to only one side of drawer 100; it being appreciated that generally the same procedure and operation may apply to the other side for installing/using a drawer of this embodiment. As previously described, channel 112 is adapted to receive a flange, such as, for example, flanges 106a and 107a, of a drawer such as drawer 100. Drawer 100 is moved into an open or closed position by sliding flange 106a along lower surface 116. A drawer stop 118 is provided by a stop wall 120 integral with and extending upwardly from the plane of lower surface 116. Stop wall 118 is integral with vertical surface 117 of channel 112 and offset slightly from surface 51 of panel 50 such that flange 106a is slidable along lower surface 116. Generally, a drawer may include a protrusion or projection, such as, for example, flange 108a, along the rear portion of the drawer. As shown in FIG. 7, flange 108a is integral with flange 106a, and drawer 100 may be slid along lower surface 116 until flange 108a contacts or engages stop wall 120 of drawer stop 118. It will be appreciated that a drawer may also include another flange (108b not shown) along the rear portion of the drawer and adjacent or integral with flange 106b.

Optionally, the shelf support means may also include a rear stop. For example, drawer slides 110 include rear stop 121 (FIGS. 6 and 6A).

To position a drawer such as drawer 100 in the drawer slides depicted in FIGS. 1, 2 and 4-9, the rear portion of the drawer and flanges 108a and 108b (not shown) are moved into upper slots 132 (FIG. 6) and 132' (FIGS. 8 and 9) until flanges 108a and 108b can fit into an openings 133 (FIG. 6) and 133' (FIGS. 8 and 9), respectively, defined by the distance between the edge of upper surface 114 and the upper edge of stop wall 120 (114' and 120' in FIGS. 8 and 9). Flanges 108a and 108b are then lowered through openings 133 and 133', respectively, until flanges 108a and 106a contact lower surface 116 and flanges 108b and 106b contact lower surface 116'. At that point, the drawer, such as drawer 100, may be slid into an open or closed position as desired along respective lower surfaces 116 and 116' of channels 112 and 112'.

The size and shapes of the drawers and/or drawer slides are not critical, and may be configured for a particular vehicle or intended use. Drawer stops, e.g., 118 need not have angled walls as depicted in FIGS. 6, 6A, 8, and 9, but may have any configuration that will sufficiently engage a portion of a drawer to prevent the drawer from opening or closing further. Additionally, a post comprising drawer support means need not be utilized. Rather, in other embodiments, drawers may be positioned using only opposing shelf support means, and the drawers may be substantially the entire width of a storage unit. Additionally, one or more posts comprising shelf support means may be positioned between opposing panels to provide more than two columns of drawers. There is no limit to the configuration or permutations, and the embodiment in FIGS. 4-9 is merely exemplary of one possible embodiment.

Figure 10:
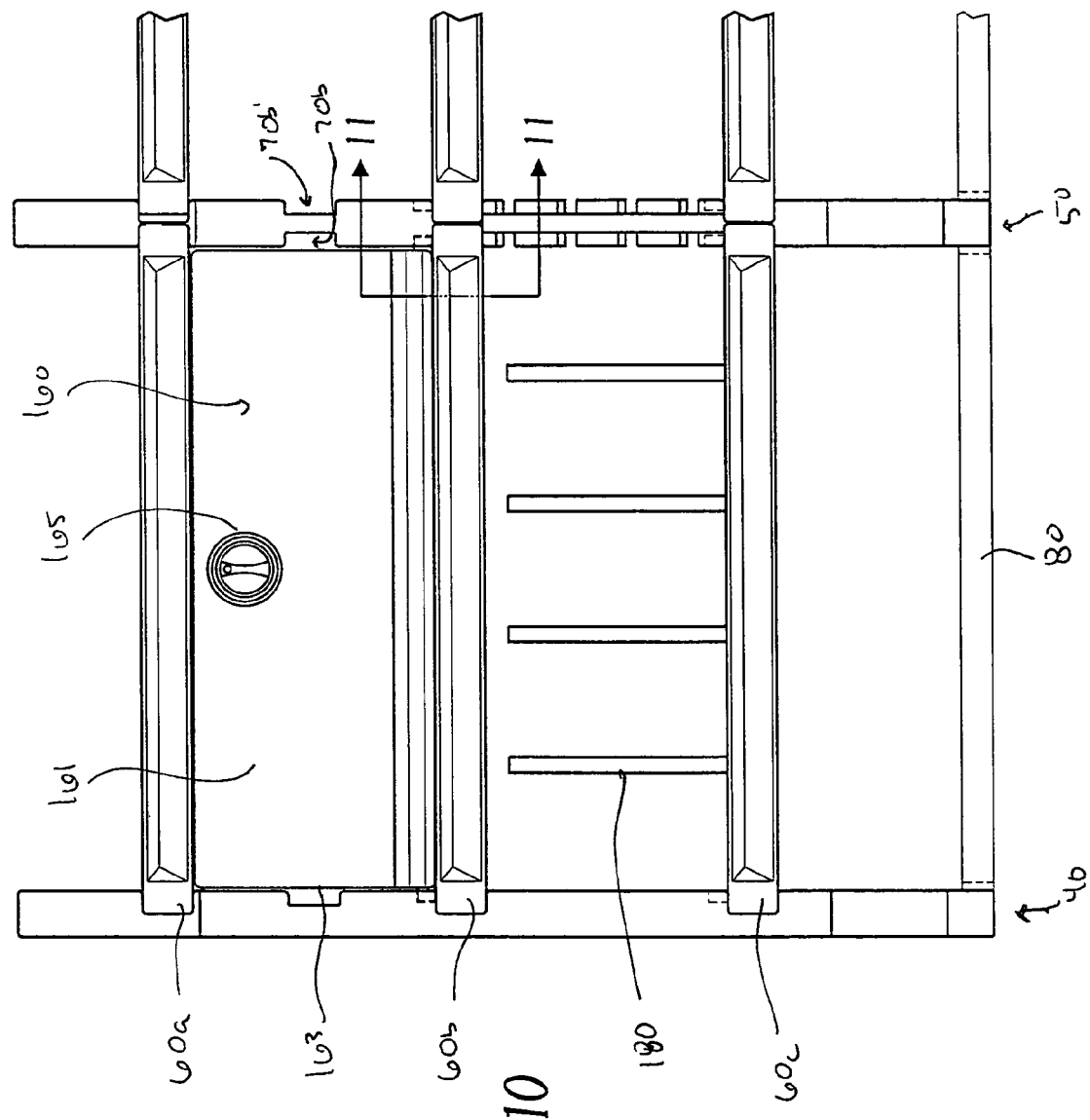
FIG. 10 is a front plan view of a storage unit having a door between the top and middle shelves of the unit.
Figure 10B:
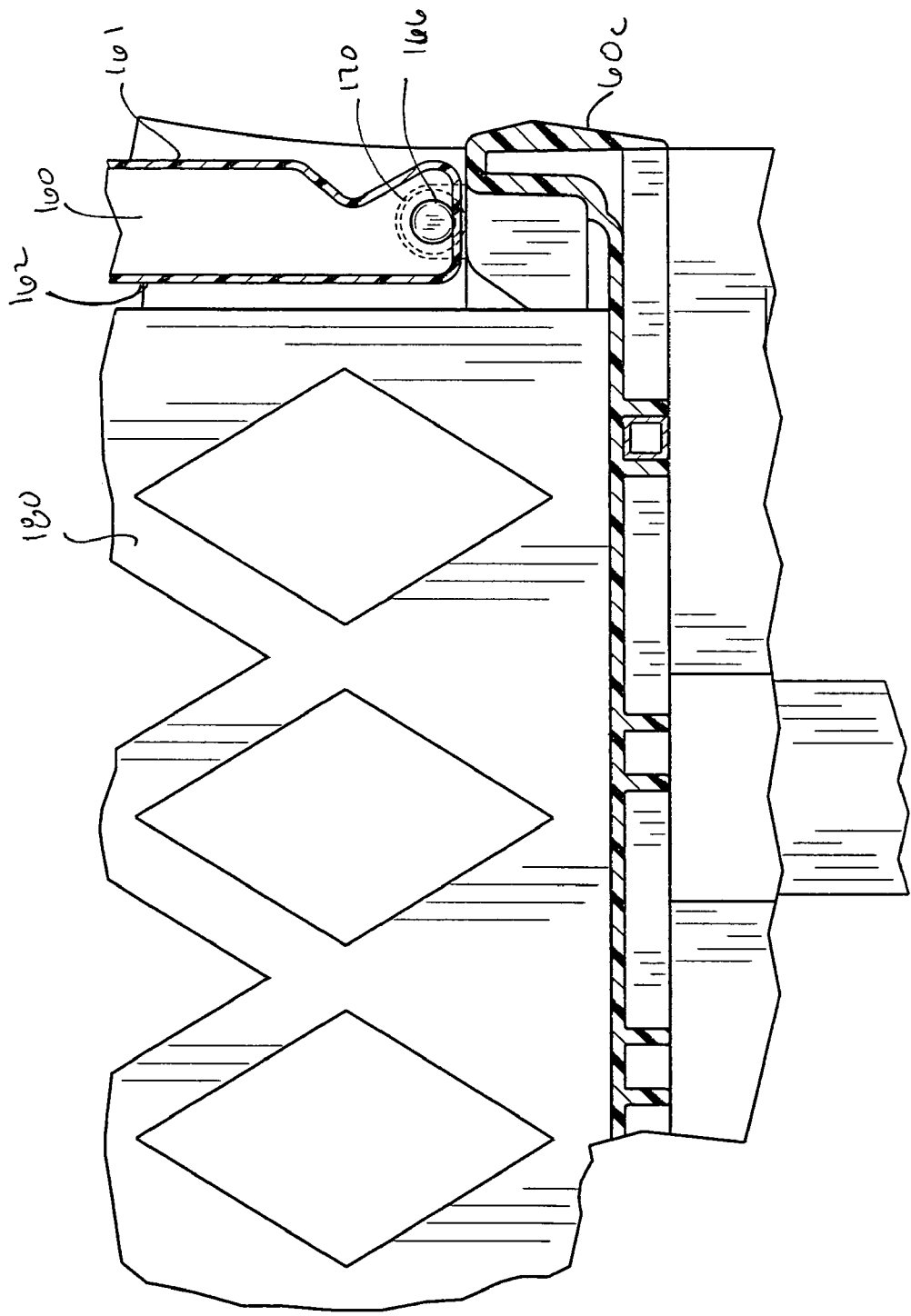
FIG. 10B is an enlarged cross sectional view of the storage unit in FIG. 10A taken along the lines 10B-10B.
Figure 12:
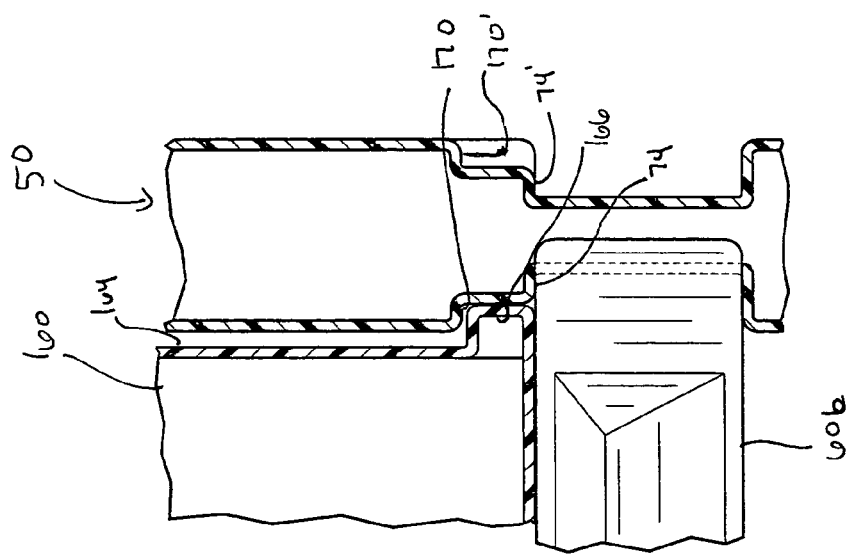
FIG. 12 is an enlarged cross sectional view of a portion of the storage unit in FIG. 11 taken along the lines 12-12 (with the shelf face not being shown in cross section)
Figure 11:
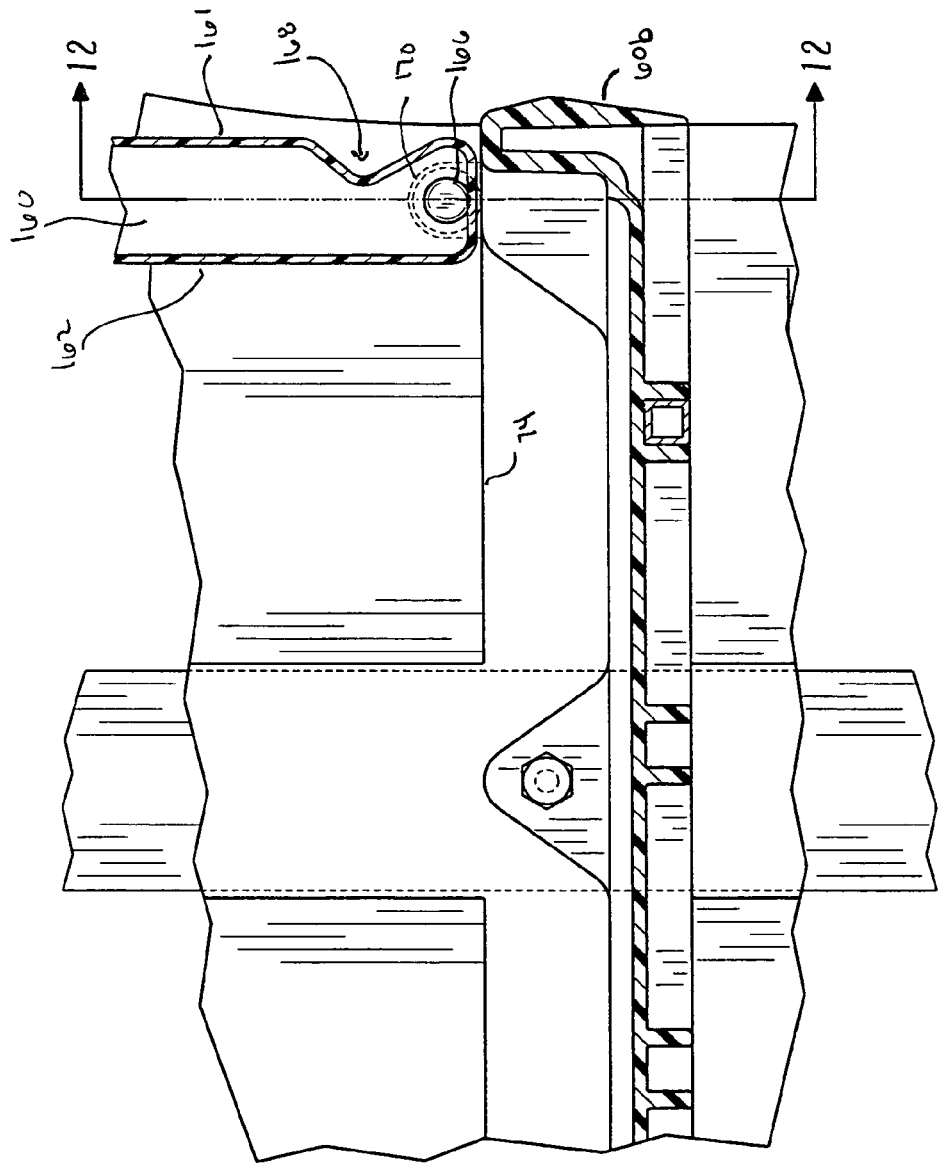
FIG. 11 is an enlarged cross sectional view of the storage unit of FIG. 10 showing details of the door hinge.

The panels may also comprise means for releasably attaching a door to successive panels and provide a locker-type environment in a unit. With reference to FIGS. 10-12, storage unit 34 is depicted as having a door positioned between either shelves 60a and 60b or between shelves 60b and 60c. The door may include any suitable means for attaching a door to the panels. For example, in one embodiment, the doors may include pins projecting from the sides of the doors for receipt in a corresponding slot in the panels. One or both of the pins may be spring loaded such that a pin may be inserted into a slot on one panel, and the (other) spring loaded pin may be depressed such that the door may be positioned between the panels and then the pin released into a corresponding slot on the other panel.

With reference to FIGS. 10-12, another embodiment is shown wherein the door comprises pins integral with and molded to the sides of the doors. The panels each comprise slots 170 (FIG. 12) integral with the upper surface 74 (FIGS. 11 and 12) of shelf support means 70 so as to define an opening at the bottom of slot 170. Door 160 is positioned between panels 40 and 50 by inserting pins 166 into the opening of slots 170. A door is held in place and a shelf, such as, for example, shelf 60c, is positioned in the shelf support means immediately below the slots into which the door has been positioned. The upper surface of the front walls and/or a portion of the side walls of the shelf maintain the door pins in place within the slot such that the door is now rotatable between an open and closed position about a horizontal axis.

Figure 13:
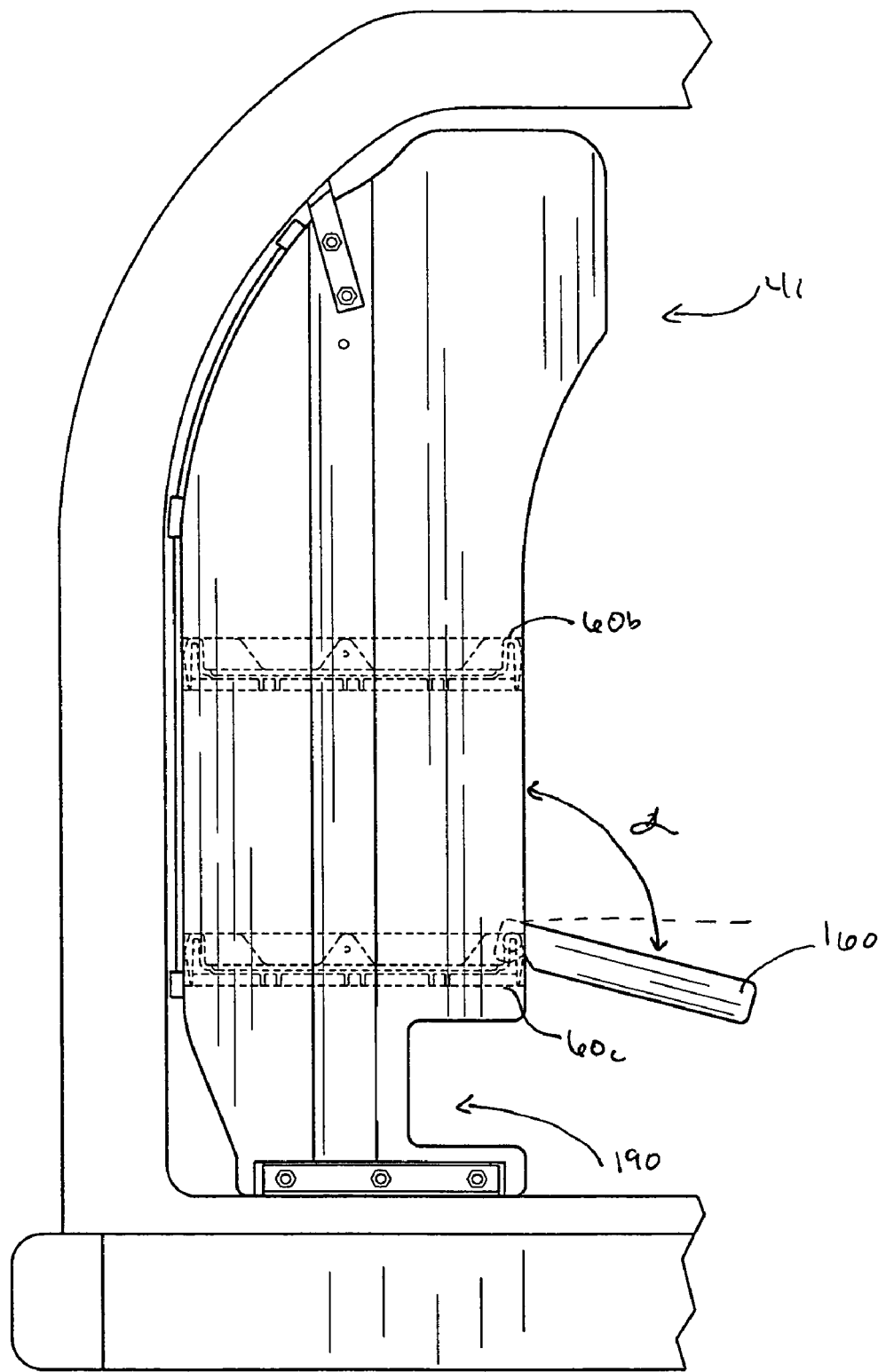
FIG. 13 is a side view of a storage unit (from the rear of the vehicle) having a door, the door being shown in a fully opened position.

The shape and configuration of the door is not limited in any manner and may be selected as desired for a particular purpose or intended use within a particular vehicle. For example, the door may be configured to allow the door to open to a selected position. With reference to FIGS. 11 and 13, door 160 comprises a grove or indentation 168 along the front surface 161 of door 160. When the door is moved into an open position the door is rotated downwardly until the apex of the groove 168 contacts a portion of the shelf 60 thereby defining an angle $\alpha$. The angle depends on the thickness of the door panel and/or the depth of the grove 168. The use of grove 168 allows door 160 to be opened to a position such that the angle $\alpha$ is at least about 90°. In the illustrated embodiment, the angle $\alpha$ is greater than 90°, which is advantageous because it reduces the space occupied by the door in an open position and may allow easier access to the interior portion of the shelf. Aisle space in a truck or van is valuable. The width of the truck or van is limited. This limited width must often be allocated between storage units on each side of the truck and the aisle between storage units. The aisle must be sufficiently wide to allow excess. However, if the aisle can be made one inch narrower by use of a door or doors that open beyond 90°, the storage system can be made one inch deeper.

The support panels (e.g., panels 40, 50, and 50') may be sized, shaped, and configured as desired for a particular purpose or intended use in a particular vehicle. For example, the panels may be generally rectangular having a relatively flat front, back, top, and bottom edges. In another embodiment, the panels may have a generally vertical or flat front edge and a back edge that has a generally vertical portion adjacent or near the bottom of the panel and a curved or angled portion towards the top of the panel to more closely mimic the shape of a vehicle's walls. In still another embodiment, as shown in the embodiment in FIGS. 1 and 2, both the front edge and the back edge of the panel may be curved or angled to more closely mimic the shape of the vehicle walls. Having the front edge of the panel mimic the shape or contour of the back edge of the panel is desirable to maximize shelf space because the depth of the panel would generally not decrease towards the top of the panel. Consequently, shelves or drawers near the top of a unit would not have to be less deep than those near the bottom. Additionally, using panels that are contoured such that the depth of the panel is essentially the same at different vertical points aids a given panel's modularity in that a shelf at one position can be moved to any other selected position without the need for obtaining or locating a different sized shelf for the unit.

The support panels may also include a cut-out portion adjacent the bottom of the panels. With reference to FIG. 2, cut-out 190 of panel 40 is recessed relative to the front edge 45 of panel 40 and includes lower surface 192, upper surface 194, and vertical surface 196. The shape and size of a cut-out portion is not critical and may be selected as desired for a particular purpose or intended use. In one embodiment, a cut-out has a square or rectangular shape. Generally, the depth of a cut-out is not limited except to the extent that the depth should not compromise the structural integrity or stability of the panel(s).

Figure 14:
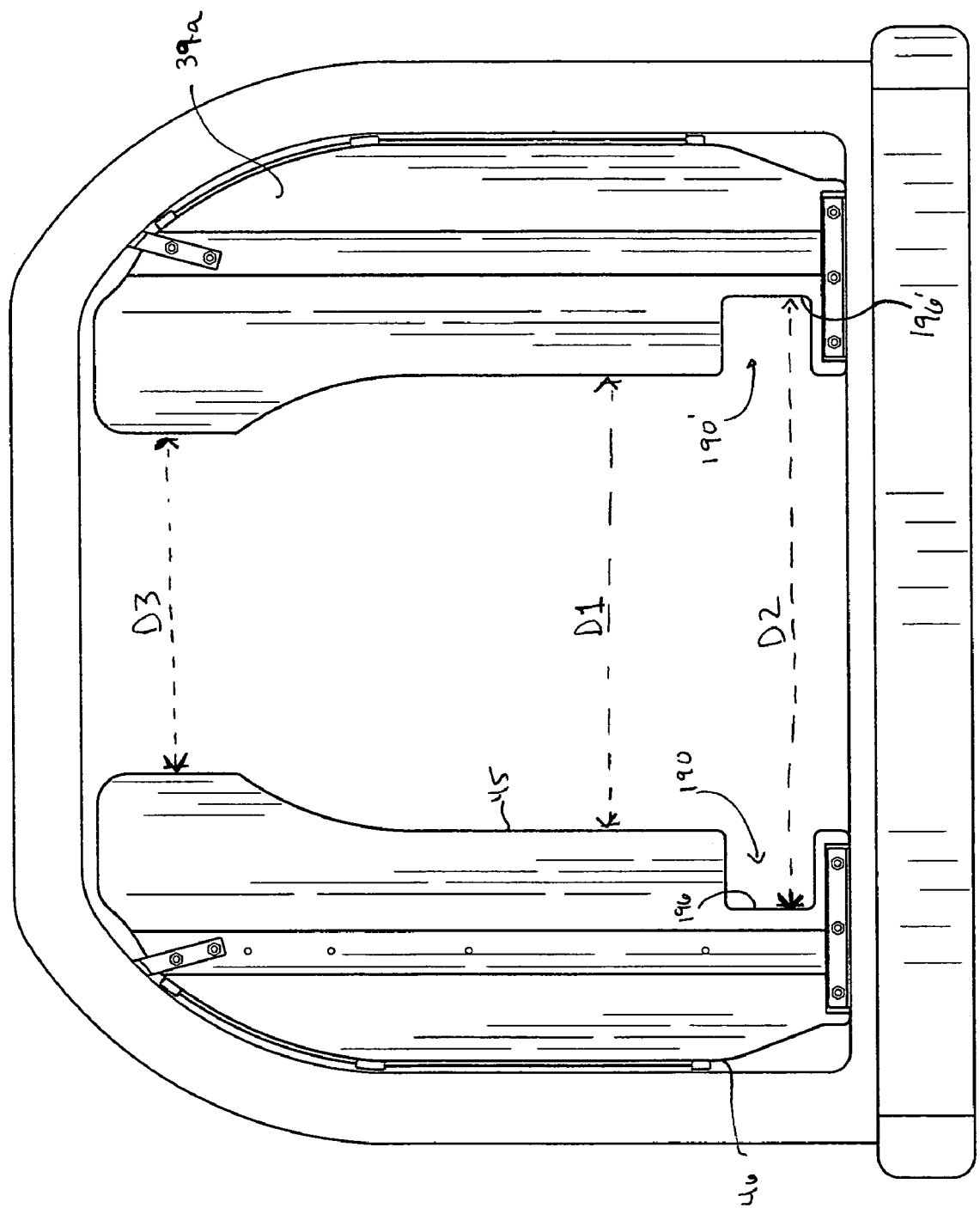
FIG. 14 is a side view (looking into the back of the vehicle) of storage units adjacent the curb-side and street-side walls of the vehicle and showing the cargo or aisle space available between portions of the units.

The cut-out portions provide extra space in the cargo area between storage units or systems on opposite walls of the vehicle. With reference to FIG. 14, the effect of employing a cut-out portion in the support panels is depicted. As shown in FIG. 14, the vertical portions of front edge 45 of panel 40 and the front edge of panel 39a are separated by a distance D1. A distance D2 is provided between vertical surface 196 of cut-out 190 and vertical surface 196' of cut-out 190' that is greater than the distance D1 between the vertical front edges of panels 40 and 39a. The cut-out portions 190 and 190', which provide distance D2, may allow for objects such as sheets or boards to be positioned between the storage units 33 and 39 that would not fit within the distance D1 of the support panels. The distance D2 may be selected as desired for a particular purpose or intended use and depends on the distance between the support panels of opposing storage units/systems, and the shape and depth of the cut out portions 190 (and 190'). For example, the panels may be provided to provide a distance D2 to allow for items such as 4' by 6', or 4' by 8' boards or sheets to be horizontally stored between the storage systems such as storage system 33 and 39.

A plug-member may be provided to cover or generally fill-in a cut-out area, such as, for example, cut-out 190. A plug-member may be dimensioned for receipt in a cut-out. A plug-member may be adapted for releasable connection to a panel member. For example, as shown in FIG. 2, plug-member 197 includes a tab 198 with apertures 199 adapted to receive a fastener. To fill the open area of cut-out 190, plug-member 197 is positioned in cut-out 190. Tab member 198 overlaps a portion of a panel, such as panel 40, and the plug-member is releasably connected to the panel by a fastener inserted through apertures 199 and into a surface of a panel.

Figure 14A:
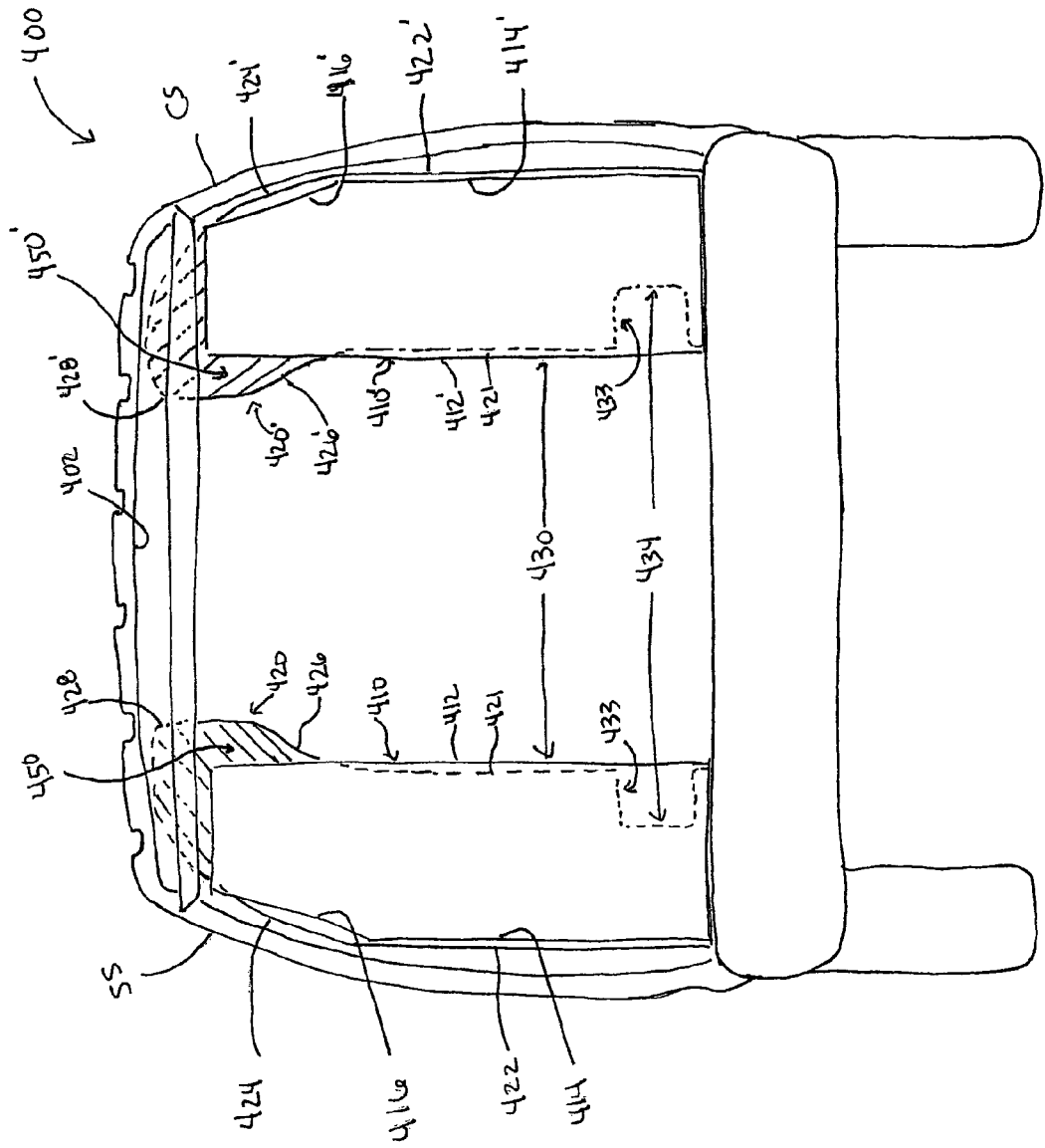
FIG. 14A is a side view (looking into the back of a vehicle) comparing the storage capabilities of storage systems employing conventional end panels to storage systems employing upright panels having curved or arcuate segments as may be employed in various embodiments of the disclosure.

While the support panels may have any shape as desired or selected for a particular purpose or intended use, FIG. 14A demonstrates the advantage of employing support panels having curved or arcuate portions along the front and/or back edges of the panels toward the top of the panels. As previously described, the front and back ends of the support panels may be curved to more closely mimic the shape or contour of the vehicle walls. FIG. 14A shows how storage space may be maximized in a vehicle, such as vehicle 400, using panels 420 and 420', in accordance with an embodiments of the present disclosure, as compared to using conventional panels 410 and 410'. The designation SS refers to the street-side of the vehicle, and CS refers to the curb-side of the vehicle. For ease of discussion in describing the shape of the support panels, panels 410 and 410' are mirror images, and panels 420 and 420' are mirror images, and reference will be made to the panels on one side of the vehicle. Conventional panel 410 comprises a vertical front edge 412, a vertical back edge 414, and an edge 416 that angles out of the vertical plane of back edge 414 and toward the top edge of panel 410. As shown in FIG. 14A, the storage space in a system using a conventional panel, such as panel 410, decreases toward the top of the panel because the distance between vertical front edge 412 and edge 416 continues to decrease toward the top of the panel. Conventional panels are also generally formed from a metal material, and it may be expensive to form contoured or shaped panels by stamping.

A panel, such as panel 420, that is formed from a polymer material, however, is more amenable to molding into desired shapes, and a shape may be provided that provides more storage space. In FIG. 14A, panel 420 comprises a polymeric material and is shaped similar to the embodiments shown in FIGS. 1-14. Panel 420 comprises a generally vertical portion 421 along a front edge of the panel, and a generally vertical portion 422 along a back edge of the panel. The generally vertical portions 421 and 422 extend from the bottom of the panel toward the top of the panel. The back of panel 420 includes a curved or arcuate portion 424 that extends or curves inwardly toward the longitudinal center line of the vehicle and upwardly toward the top and front edge of the panel. Additionally, the front edge of the panel includes a curved or arcuate portion 426 that extends inwardly toward the longitudinal center line of the vehicle 400 and upwardly toward the ceiling 402 of the vehicle. Providing a panel with front and back edges that are curved or arcuate provides additional storage space, such as the shaded space 450, as compared to conventional panels 410. By providing arcuate front and back edges having similar degrees of curvature, the distance between the front and back edges does not decrease. Thus, in panel 420, for example, there is more space near the top of the panels 420 that can be utilized for storage.

Employing panels with curved or arcuate portions allows for tighter tolerances in fitting a shelving unit in a vehicle. For example, providing panels with a curved or arcuate surface near the top of the panels allows for the creation of taller panels to better utilize the overhead space in a vehicle. While conventional panels, such as panel 410, could be made taller, there is a limiting return in useful storage space because the depth of the panel decreases toward the top of the panel. The limited additional storage space may not outweigh the cost to provide a taller unit. With the shaped polymer panels, such as panel 420, that have curved or arcuate edges toward the top of the panel, however, because more useful storage space is provided and there is more incentive to employ taller panels. Thus, the panels can be made taller to extend into the overhead space of the vehicle. In one embodiment, for example, a panel having curved or arcuate portions along the edges may be provided such that there is a distance of less than two inches between the top of the panel and the ceiling of the vehicle. In another embodiment, this distance may be one inch or less. Comparatively, conventional panels typically have a distance of about five to about seven inches between the top of the panel and the vehicle ceiling. Similarly, panels having a curved or arcuate back edge allow for tighter tolerances along the vehicle walls.

The degree or severity of the curvature of an edge of a panel may be selected as desired for a particular purpose or intended use.

FIG. 14A also demonstrates the storage space that may be available with a polymer storage panel having a cut-out portion as compared to conventional panels without such a feature. As shown in FIG. 14A, there is a distance 430 between the front edges of conventional panels 410 and 410'. In certain vehicles, for example, this distance may be about 37 inches. The use of polymer panels having a cut-out portion, such as cut-out portions 433 and 433 in panels 420 and 420', respectively, provides extra space 434 between certain areas of the opposing storage units. The space 434 may be, for example, to provide a space to store 4'×8' sheets.

A back panel may be provided adjacent to successive support panels. A back panel may be provided as merely a backing to a storage unit and/or to connect adjacent support panels. A back panel may be held in position by any suitable means including, but not limited to, clips, fasteners, bolts, rivets, pop rivets, and the like. In some embodiments, a back panel is releasably connected to a shelving unit.

In one embodiment, a back panel may be retained or positioned adjacent the back surface of a panel by a retainer clip molded to the back edges of the support panels. With reference to FIGS. 15 and 16, a retainer clip on an intermediate panel, such as for example panel 50, is shown. The retainer clip 140 includes a base member 142 extending from and integral with rear surface 56 of panel 50. The retainer clip includes enlarged outer member 144 extending beyond the sides of the base member 142 such that a channel 146 is provided between back surface 56 of panel 50 and the underside of outer member 144. Channel 146 is sized to receive a back panel, such as back panel 82'. As show in FIGS. 15 and 16, the retainer clip 140 provides a channel adjacent each of the first and second surfaces of the support panel. The shape of the base member, e.g., member 142, and/or the shape of the enlarged outer member, e.g., member 144, may be selected as desired for a particular purpose or intended use. For example, the sides of the base member may be, but are not limited to, parallel, curved, or angled, diverging sides. Similarly, the undersides of the elongated outer member may be, but not limited to, parallel, curved or angled relative to the back surface of the support panel.

Figure 17:
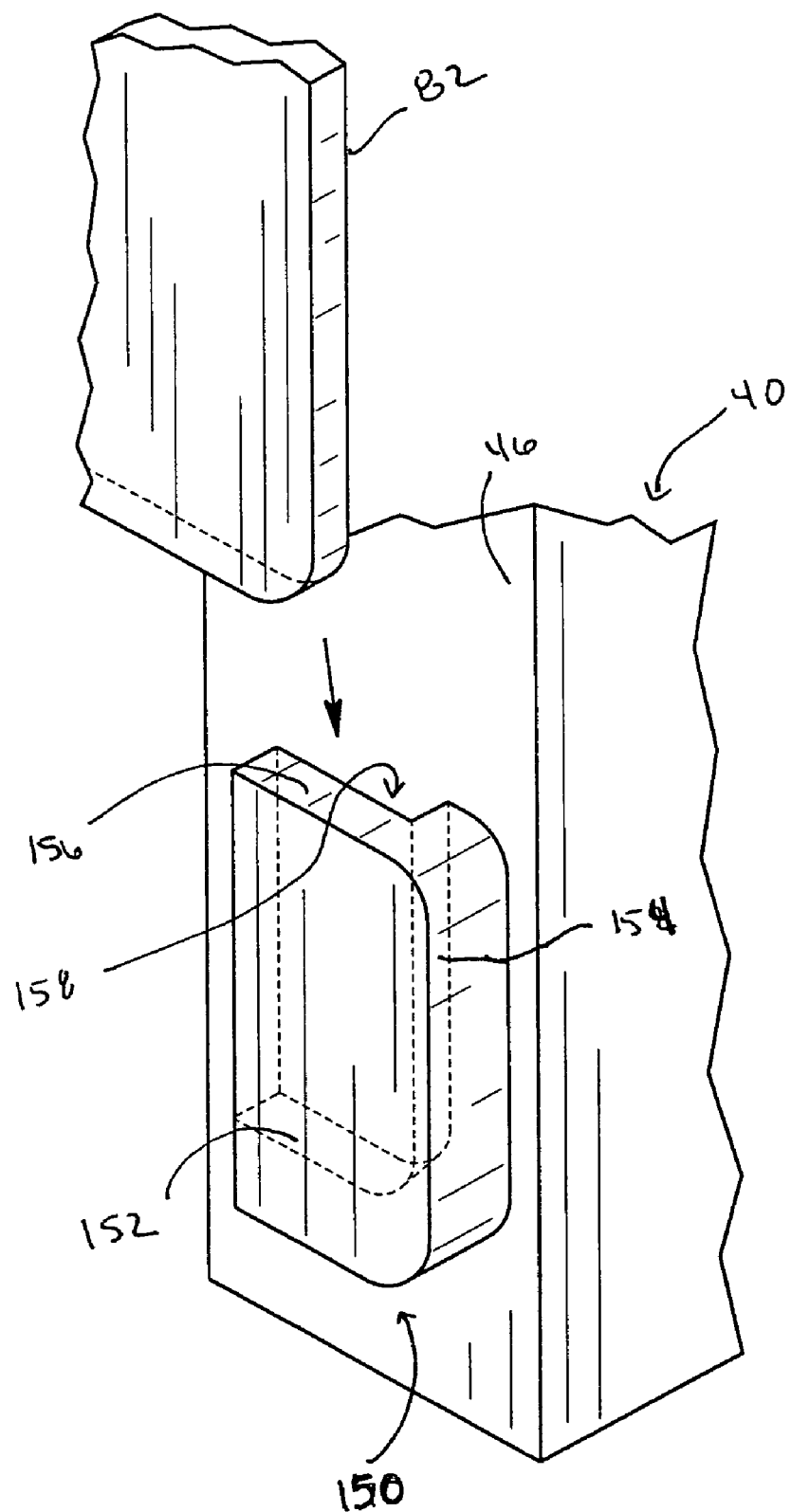
FIG. 17 is a detail showing a retainer means for positioning a back panel along an end panel.

Clips may optionally be provided, such as clip 150 in to FIG. 17, that only include one channel for receiving a back panel. With reference to FIG. 17, outer portion 156 of clip 150 is set off from back surface 46 of panel 40 by walls 152 and 154 of clip 150 so as to define a channel 158 between back edge 46 of panel 40 and the underside of outer portion 156. As shown in FIG. 17, clip 150 includes a bottom wall 152. Bottom wall 152 may be suitable for supporting a bottom portion of a back panel and preventing the panel from moving downwards. It will be appreciated that intermediate panels, such as panel 50, may include clips with bottom walls. Employing a clip having a bottom wall may eliminate the need for further means such as fasteners or bolts to retain a back panel in place. Even if clips with bottom walls are used, a back panel may be fastened or bolted to a panel.

The back panels may have a height that extends from the top of a storage unit to the bottom of a storage unit. In other embodiments, a back panel may have a height that does not extend to the bottom of the storage unit to accommodate any objects on the floor including, for example, a wheel-well of the vehicle.

A back panel may include an aperture, such as aperture 84 (FIG. 2). Aperture 84 may be dimensioned for receiving a light or fan or any other desirable feature. A light may be particularly desirable for placement in aperture 84. A cargo area may not be sufficiently lit, or the light may be blocked by a person moving around in the cargo area or standing between a main light source and a storage unit. Thus a light source disposed in aperture(s) 84 may provide sufficient lighting to a storage unit or a particular area of the storage unit. The extra light source in a storage unit allows a person to operate in or search through a storage unit without having to handle an extra light source such as a flash light.

A back panel may be formed by any suitable material, including, but not limited to, pressboard, cardboard, plastic, fiber reinforced plastic, and the like.

The shelves are not limited in any manner and may be shaped and sized as desired for a particular purpose or intended use. Generally, a shelf includes a front wall, a back wall, opposing side walls, a shelf surface, and a bottom surface. One of the side walls may include an aperture for releasably receiving a fastener to secure the shelf to a respective panel.

In one embodiment, shelves may have a configuration such that two shelves may be stacked or stored in a nesting arrangement. This may be accomplished, in one embodiment, by providing a shelf configuration wherein a portion of a shelf's side panels have a height less than the height of the front and back walls of the shelf. For example, with reference to FIG. 18, shelf 60 comprises front wall 61, back wall 62, and side walls 63. As shown in FIG. 19, side wall 63 includes hollows 64a and 64b recessed relative to the upper edge of side wall 63 and separated by section 65. Section 65 includes projection 66 adapted to receive a fastener to connect a shelf to a panel. It will be appreciated that a shelf does not have to include section 65 and could include a generally continuous hollow or recessed area along a side wall. By providing a side wall having a portion or portions, such as hollows 64a and 64b, with a height less than the height of the front walls and back walls of the shelf, a shelf may be inverted and nested with another self such as shown in FIG. 19. In FIG. 19, shelf 60' is inverted and positioned on shelf 60 such that the upper surface of back wall 62' of shelf 60' contacts portion 64b of shelf 60 and portion 64b' of shelf 60' contacts the upper surface of back wall 62 on shelf 60. Providing shelves of a configuration that allows for two shelves to be nested allows shelves to be stored in a manner that requires less space than if the shelves were merely stacked on top of one another. This is beneficial because space may be limited in many vehicles that are already filled with tools, parts, and the like.

A shelf surface may have any design or configuration as desired for a particular purpose or intended use. For example, a shelf surface may be generally flat or smooth. In another example, a shelf may include one or more projections or grooves or channels. Projections or channels or grooves may have any shape, height, depth, and/or width, and may be oriented in direction as desired for a particular purpose or intended use. As an example, a shelf surface such as surface 69 may include projections 128 (FIG. 1). A shelf surface such as upper surface 69 may also include slots or groves such as slots 130 (FIG. 1) for receiving various add on pieces such as, for example, drawer support posts 122 (FIGS. 4, 5A, and 5B), dividers 180 (FIGS. 1, 10, 10A, and 10B) or the like.

In one embodiment, the shelves may comprise a means for adjusting the load rating of the shelf as is described in co-pending application U.S. patent application Ser. No. 10/821,366, the entire disclosure of which is incorporated herein by reference. Shelves used in storage units in accordance with the present disclosure are generally formed from polymer materials such as, for example, plastics or composite materials. Because the size of the storage units is not limited and may be any length as desired for a particular vehicle or intended use, the shelves may have widths of several feet or greater. Depending on the thickness of the shelf walls and horizontal support areas, along with the strength of the particular polymer plastic used to form the shelf, shelves several feet long may not be able to withstand a particular load. As shown in FIG. 18, additional supports may be used to provide additional support to a shelf within a storage unit. Specifically, FIG. 18 shows a shelf 60 having a bottom surface 68. Shelf 60 includes slots 67a, 67b, and 67c offset upwardly from bottom surface 68. Slots 67a-c extend lengthwise (between the side walls of the shelf) along the bottom of the shelf. As shown in FIG. 18, slots 67a-c are dimensioned to mate with and surround three sides of the square tube or bar 240.

Preferably, bar 240 is dimensioned to snap into slots 67a-c and fit snugly therein. Preferably, the support bars are dimensioned so that the lower (exposed) extremity of the bar is substantially coplanar with the bottom surface of the shelf such that the support bar will contact the upper surface of a shelf support. The support bars may also be dimensioned so that the lower extremities of the bar are not coplanar with the bottom surface of the shelf but slightly recessed. In that case, the bar would not contact the upper surface of the shelf support. The bars, such as bars 240, provide further support across the width of the shelf so that the shelf is able to support a greater load. Bars or beams having different cross-sectional shapes, such as, but not limited to, a u-shape, rectangle, quonset-shape cylinder, or the like can also be used.

The use of support bars positioned in widthwise slots of a shelf provides a method for adjusting the load rating of a shelf. Specifically, a shelf that is not further supported by any support bars has a first load rating. A shelf that is supported along the width of the shelf by one bar has second load rating, and so forth. Thus, a shelf may have N+1 load ratings were N is the number of widthwise slots in the shelf bottom surface to accommodate bars such as, for example, bar 240. The load rating may, therefore, be adjusted by either adding or removing bars as needed for the intended use. Thus, for example, in FIG. 19, shelf 60 would have four load ratings, i.e., one load rating without any support bars, and three additional load ratings depending on whether one, two or three bars are positioned within slots 67a, 67b, or 67c. There is no limit as to the number of widthwise slots that a shelf may have (on the bottom surface). Because the supports are tightly restrained in the slots 67a-c, they are prevented from rattling.

The support bar 240 is not limited in any manner. A support bar may be configured in any shape and made from any material to provide the desired support for a particular use. For example, a support bar may be made from steel or extruded aluminum or a fiber reinforced composite. Alternatively, a support bar may be molded inside the shelves. That is, the bars may be encapsulated within a shelf. While encapsulating support bars in the shelves may increase the load rating of a particular shelf, encapsulating the support bars within the shelf does not allow for the load rating of the shelf to be adjusted.

A storage system in accordance with the present disclosure may optionally include a cubby unit. A cubby unit may be a completely separate structure or it may be formed using a wall of another storage unit. In one embodiment, for example, a cubby unit may be formed by closely spacing two support panels.

With reference to FIG. 1, cubby unit 38 is formed by closely spacing cubby panel 202 adjacent a support panel such as panel 50'. The height of cubby panel 202 may be selected as desired for a particular purpose or intended use. In one embodiment, cubby panel 202 is about 50% of the height of support panel 50'. In another embodiment, cubby panel 202 is greater than about 50% of the height of a support panel such as panel 50'.

Figure 20:
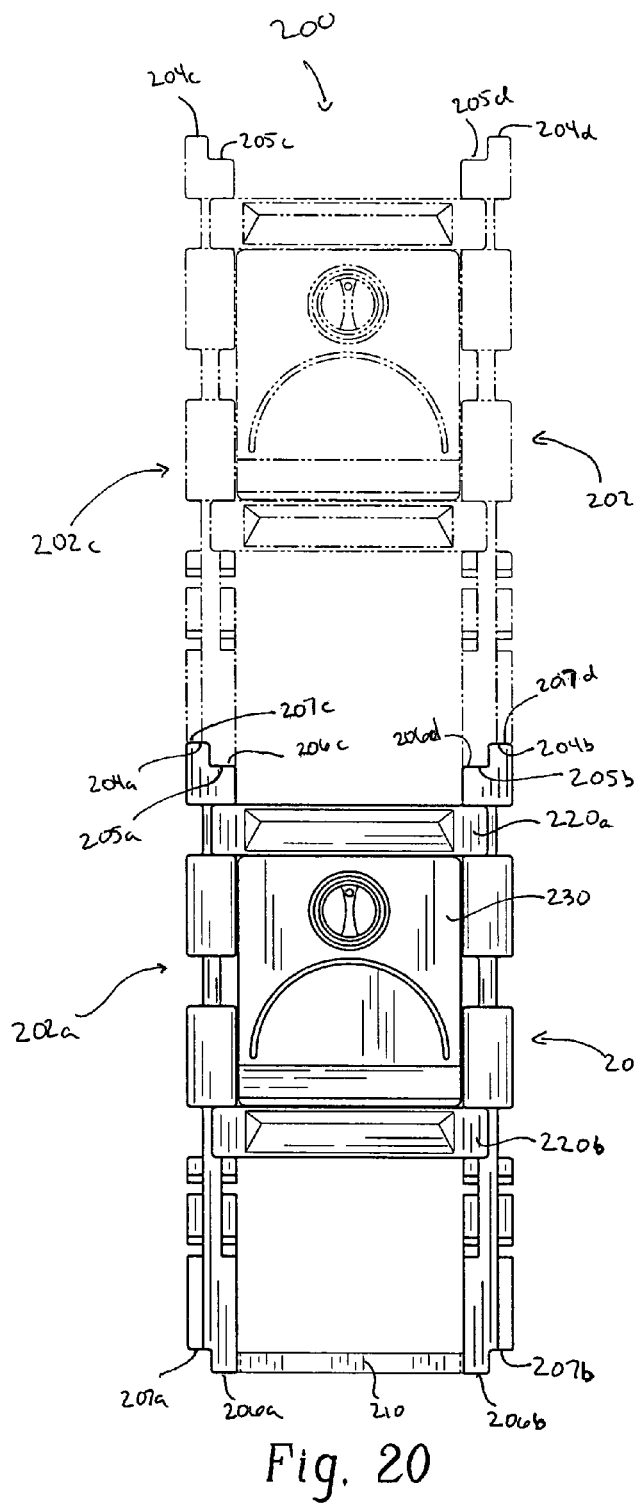
FIG. 20 is a front plan view of a cubby unit.
Figure 21:
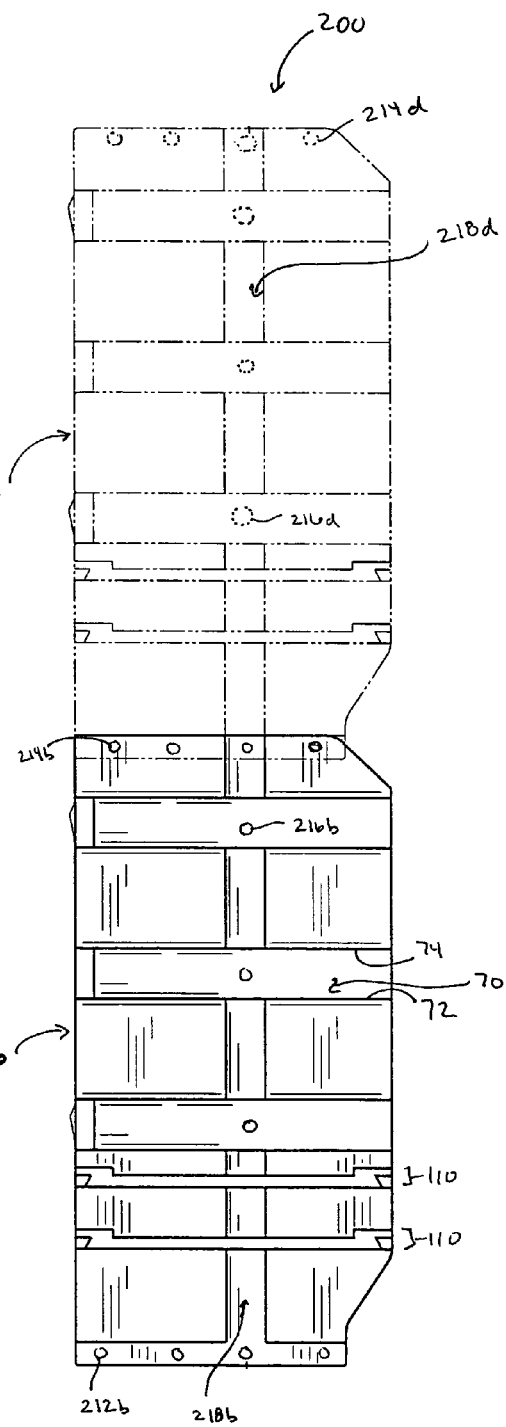
FIG. 21 is a side plan view of the cubby unit of FIG. 20.

In another embodiment, a cubby unit may be an individual unit separate from the other shelving units in a shelving system. With reference to FIGS. 20 and 21, a cubby unit is shown comprising an upright cubby panel 202a and an upright cubby panel 202b opposite and generally parallel to cubby panel 202a. Each of the cubby panels includes a first surface, a second surface, a front edge, a rear edge, a top, and a bottom. The cubby panels 202a and 202b may be connected by a connecting member such as connecting member 210 along the bottom of the cubby panels. The cubby unit 200 may include shelf support means such as shelf support means 70 and one or more shelves such as shelves 220a and 220b supported by the shelf support means. The cubby panels may also include drawer slides such as drawer slides 110.

Cubby panels 202a-202d in FIGS. 20 and 21 have a different configuration than cubby panel 202 in FIG. 1. In FIG. 1, cubby panel 202 comprises shelf and drawer support channels on only one face of the panel. Cubby panels 202a-202d are shown having shelf and drawer support channels on both the first and second surface such that another storage unit panel or other cubby panels may e added on either side of the cubby unit.

The cubby panels in FIGS. 20 and 21 have a configuration that allows a panel to be stacked on top of the other panel in a mating relationship, which allows for creating for a taller cubby unit if desired. As shown by the dashed lines in FIGS. 20 and 21, cubby unit 200 may include cubby panel 202c stacked on top of cubby panel 202a and cubby panel 202d stacked on cubby panel 202b. Cubby panel 202a includes an upper surface 204a and a ledge 205a, and a bottom surface 206a and an inverted ledge 207a. Cubby panel 202c is identical to cubby panel 202a and includes and upper surface 204c and an upper ledge 205c as well as a lower surface 206c and an inverted ledge 207c. The upper surface 204a and ledge 205a are shaped and dimensioned to mate with the inverted ledge and lower surface of another panel, e.g., inverted ledge 207c and lower surface 206c, respectively, of cubby panel 202c. Cubby panel 202d is stacked on top of cubby panel 202b in a manner similar to the stacking of panel 202c on panel 202a. The interaction of the ledges and upper surfaces prevents the top cubby from sliding sideways with respect to the bottom cubby.

Cubby panels may also include one or more apertures adjacent each of the top and bottom ledges of the panels to allow stacked cubby panels to be releasably connected together and prevent stacked cubby panels from sliding forward and/or backward relative to each other. For example, as shown in FIG. 21, panel 202b includes apertures 212b adjacent the bottom of the panel and aperture 214b adjacent the top of the panel. When cubby panel 202d is stacked on panel 202b, the panels may be releasably connected via, for example, a fastener, through apertures 214b of panel 202b and corresponding apertures 212d (not visible) of panel 202d.

Similar to the support panels, the cubby panels may include apertures through which a shelf may be releasably secured to a cubby panel. For example, cubby panels 202b and 202d include apertures 216b and 216d, respectively, disposed between the shelf supports of the cubby panels.

Cubby panels may include generally vertical channels. For example, cubby panels 202b and 202d include vertical channels 218b and 218d, respectively. When a cubby unit is formed by stacking cubby panels, a channel may be formed by channels 218b and 218d that is substantially similar to channel 90 previously described herein and dimensioned for receiving a vertical member. That is, in one embodiment, when stacked, channels 218b and 218d may be taken as a single channel similar to channel 90 of the support panels. A vertical member may be disposed within the channels 218b and 218d and, similar to that of a vertical member disposed within a vertical channel of a support member, provide a metal-to-metal contact point between a cubby unit and a connecting member that connects a cubby unit to a portion of a vehicle. In another embodiment, a vertical member disposed within the vertical channels of stacked cubby units may be releasably connected to the cubby panels to prevent the stacked panels from sliding forward or backward relative to one another.

As previously mentioned, using stackable cubby panels to create a cubby unit wall or a cubby unit allows for creating taller units. This feature may be beneficial to create cubby units in different sized vehicles. For example, a system or kit may include a cubby panel or panels that have a height of about 50% of the upright panels used for the other storage units. In another embodiment, a cubby panel may have a height greater than about 50% of the height of a support panel. In one embodiment, a cubby panel may have a height that is about 75% the height of the support panels. The height of a cubby panel is not critical and may be selected as desired for a particular purpose or intended use. A first vehicle, however, may have a height in the cargo area that could not accommodate a cubby unit formed from stacking the cubby panels. A second vehicle may have a cargo area height that could accommodate a cubby unit formed from the stacked cubby panels. Thus the same panels in one vehicle may be used to create a different (sized) unit in another vehicle.

Figure 22:
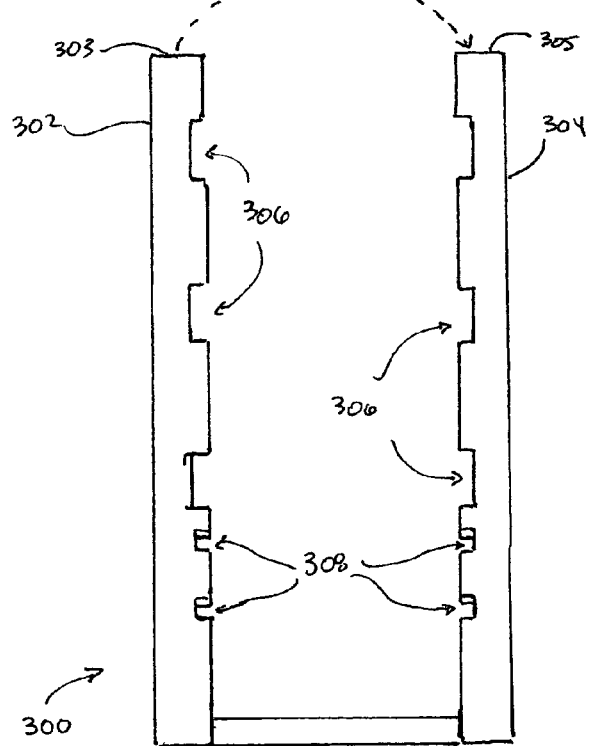
FIG. 22 is a front plan view of another cubby unit.
Figure 22A:
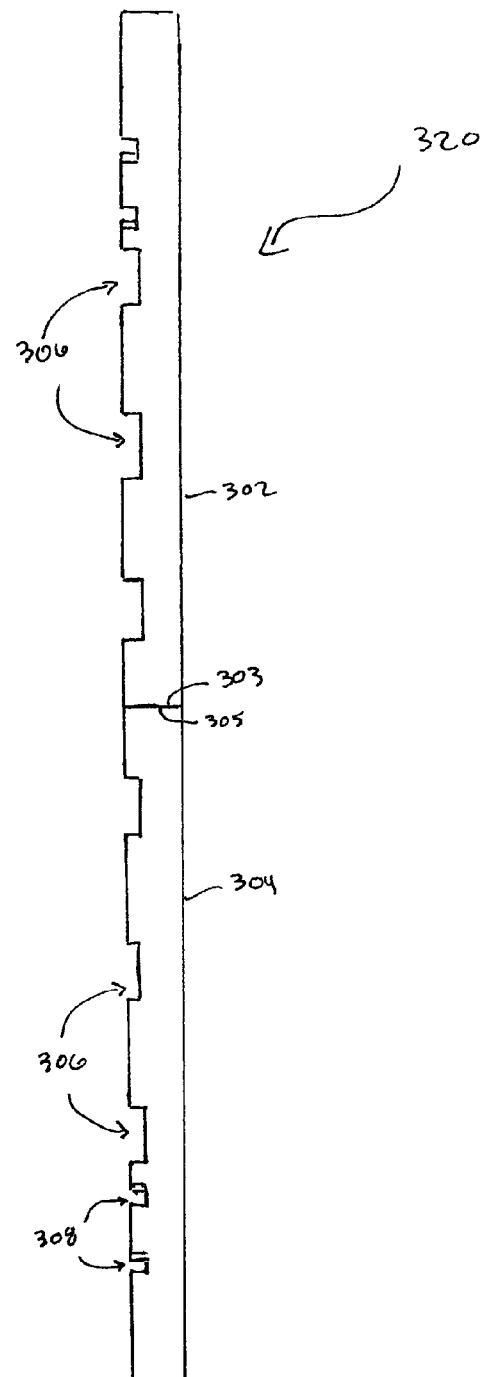
FIG. 22A is a front plan view of a panel formed by flipping one of and then stacking the cubby panels of FIG. 22.

In another embodiment, cubby panels may be configured such that opposing panels may be stacked to form a single, taller cubby panel (or storage panel). With reference to FIG. 22, a cubby unit 300 is shown comprising cubby panels 302 and 304. Cubby panels 302 and 304 comprise first and second surfaces, the first (outer) surface of each panel being generally planar, and the second (inner) surface of each panel comprising shelf support channels 306 and drawer slide channels 308. Panels 302 and 304 are essentially mirror images of each other, with the second (inner) surfaces of the opposing panels facing each other. The cubby panels 302 and 304 are connected along a bottom, front edge of the panels by connector member 310. The cubby unit 300 could comprise one or more shelves or drawers, but is shown in FIG. 22 without such storage features. A taller cubby panel 320 (FIG. 22A) may be formed by disconnecting connector member 310 and flipping or inverting panel 302 and placing top edge 303 of panel 302 on top edge 305 of panel 304. Panels 302 and 304 may be connected in any suitable manner to prevent the panels from slipping in either a front-to-back or side-to-side manner. For example, a connector member could be releasably fastened to any of the inner surface, outer surface, front edge, and/or back edge of the panels. The new panel 320 may then be positioned adjacent another cubby panel or support panel as desired to provide a new storage space for a vehicle. It will be appreciated that a new panel could also be created by inverting or flipping panel 304 onto panel 302.

The ability to invert a panel may be desirable in the field where a vehicle may not have additional pieces necessary to form a different panel structure. For example, a vehicle may not have the capacity to store extra cubby panels to form a taller section. Or, cubby panels, such as: for example, 302 and 304, could be removed from one vehicle in which they are used to form a cubby unit, such as 300, and then inserted into a separate vehicle as a taller panel simply by inverting the cubby panels to form the taller structure.

The shape, size, and general configuration of a cubby panel may be selected as desired for a particular purpose or intended use. The cubby panels may include features similar to those of the upright vertical panels of the storage units, including, for example, shelf support means, drawer support means, cut-out portions, vertical channels for receiving a vertical member, and the like. Similar to the upright or support panels of a storage unit, a cubby panel may include such features only on one side of the cubby panel or may include such features on both sides, such that a storage system may be expanded by adding additional upright/support panels or cubby panels. It will also be appreciated that a cubby panel may have a generally planar upper surface and does not have to have a ledge configuration as shown in FIGS. 1, 20, and 21.

The primary components of an individual storage unit, e.g., support panels, cubby panels, shelves, drawers, dividers, of a shelving unit/system in accordance with the present disclosure are formed from a material other than metal. The components are formed from a polymer material such as plastic materials. Suitable plastic polymers include, but are not limited to, polyethylenes, polypropylenes, polystyrene, acrylonitrile-butadiene-styrene resins, phenolic resins, polyurethanes, polyolefins, polyisocyanurates, and the like. The polymer materials may also be composite materials, i.e., a polymer matrix reinforced with a fiber or other reinforcing material having a sufficient length to thickness ratio to provide a desirable reinforcing function in one or more directions. In one embodiment, the polymer material is a foamed polymer. Foamed polymers are also known as cellular polymers, polymeric foams, and expanded polymers. Examples of suitable foamed polymers include, but are not limited to, cellular polystyrene, polyurethane foams, polyisocyanurate foams, phenolic foams, cellulose acetate, and polyolefin foams.

The components of a storage unit/system in accordance with the present disclosure may be formed by any suitable molding method including, but not limited to, injection molding, blow molding, vacuum forming, and the like. Foamed polymers may be formed by injection molding, blow molding, extrusion, casting, vacuum forming, and the like.

A storage system in accordance with the disclosure is modular in a number of difference aspects. In one aspect, an individual storage unit is modular in that shelves, drawers, doors, dividers, and the like may be removed and/or repositioned to provide different size spaces to meet a particular storage need. Additionally, the length of an individual storage unit is changeable by changing the distance between support panels.

In another aspect, a storage system comprising at least two storage units may be reconfigured by adding or removing storage units. In some embodiments, the storage units of a storage system may be separate storage units positioned adjacent one another. In other embodiments, such as, for example, storage system 33 in FIG. 1, adjacent storage units share a support panel (e.g., panel 50 is shared by storage units 34 and 36). Additional storage units could be added by simply adding support panels. Additionally, the size of one storage unit maybe changed without the need to change the size of another unit in the system.

A storage unit or storage system may be reconfigured in any way desired for a particular purpose or intended use. The above combinations, embodiments, and examples of how a storage unit or system may be reconfigured are merely exemplary embodiments and examples of a few of the numerous combinations or configurations.

A kit may also be provided that includes one or more of at least one of the components to form a storage unit or system in accordance with the disclosure. For example, a kit may include two or more support panels, one or more shelves, one or more drawers, doors, dividers, etc. A kit that includes shelves may include shelves of different lengths to form storage units, including cubby units, of different sizes.

The exemplary embodiment has been described with reference to the specific embodiments disclosed herein. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A modular storage unit for a vehicle having a front, a back, a first side wall, and a second side wall, the storage unit comprising:
(a) a first panel having a top, a bottom, a front edge, a rear edge, a first surface, and a second surface opposite the first surface, the second surface comprising at least one channel recessed relative to the second surface and horizontally disposed between the front and rear edges of the first panel, and the first panel including a support member extending substantially between the top and the bottom of the first panel, wherein at least one of the first and second surfaces of the first panel includes a support member channel formed therein, open to the at least one of the first and second surface, and extending substantially between the top and the bottom, the support member channel receiving the support member such that the support member is at least partially exposed to view along the at least one of the first and second surfaces of the first panel;
(b) a second panel generally parallel and opposite the first panel, the second panel having a top, a bottom, a front edge, a rear edge, a first surface, a second surface, the first surface of the second panel being oriented toward the second surface of the first panel, and at least one channel recessed relative to the first surface of the second panel and horizontally disposed between the front and rear edges of the second panel; and
(c) a third panel extending in a lateral direction between the first panel and the second panel for coupling the first panel to the second panel;
wherein the first panel and the second panel comprise a polymer material,
the support member is spaced apart from the second panel, and
the modular storage unit is configured for use in a vehicle with the tops and the rear edges of the first and second panels curved in a plane that is generally parallel to the first and second panels to correspond substantially with at least one of the side walls of the vehicle;
wherein the horizontal channels are shelf support channels,
wherein a shelf is removably disposed between opposite shelf support channels; and
wherein the shelf is directly fastened to the support member with a fastener that secures the shelf in the lateral direction relative to the support member.

2. The modular storage unit of claim 1, wherein the at least one horizontal channel in the first and second panels extends to the front of each of the panels and defines an opening along a portion of the front edge of each of the panels.

3. The modular storage unit according to claim 1, further comprising at least one horizontal drawer support channel formed in each of the first and second panels.

4. The modular storage unit according to claim 1, wherein the first panel comprises
a slot recessed relative to the second surface of the first panel, the second panel comprises
a slot recessed relative to the first surface of the second panel and positioned opposite the slot on the first panel, the slots being positioned immediately above an upper edge of at least one of the horizontal channels of the first and second panels and defining an opening adjacent the upper edge of the shelf support channels, and
the storage unit further comprising a door having a left edge, a right edge, a top, and a bottom, the door comprising a first pin integral with left edge of the door and a second pin integral with the right edge of the door, the pins disposed adjacent the bottom of the door and dimensional for receipt in the slots;
the door being rotatably mounted to the first and second panels by positioning the first pin into the slot on the first panel, positioning the second pin into the slot on the second panel, and positioning a shelf into the shelf support channels immediately beneath the slots into which the pins of the door have been positioned.

5. The modular storage unit according to claim 4, wherein the door further comprises an outer face, the outer face contacting the shelf when the door is rotated into a fully open position, the door in the fully opened position defining an angle of at least about 90 degrees relative to a closed position of the door.

6. The modular storage unit according to claim 5, wherein the door further comprises a horizontal groove adjacent a bottom of the door and recessed relative to the outer face of the door, the groove being positioned such that when the door is rotated to the fully opened position, the groove communicates with the shelf such that the door in the fully opened position defines an angle relative to the closed position of greater than 90 degrees.

7. The modular storage unit according to claim 1, wherein the shelf comprises a polymer material.

8. The modular storage unit according to claim 1, wherein (i) the second surface of the first panel further comprises at least one drawer slide recessed relative to the second surface of the first panel, and (ii) the first surface of the second panel further comprises at least one drawer slide recessed relative to the first surface of the second panel, the drawer slide of the first panel opposing the drawer slide at the same general vertical height on the second panel.

9. The modular storage unit according to claim 8, further comprising a drawer removably disposed between a pair of opposing drawer slides.

10. The modular storage unit according to claim 1, further comprising a connecting member configured for coupling at least one of the first and second panels to the vehicle.

11. The modular storage unit according to claim 1, wherein the second panel includes a support member extending substantially between the top and the bottom of the second panel, and the support member spaced apart from the first panel.

12. The modular storage unit according to claim 11, wherein the first surface of the second panel includes a support member channel formed therein, open to the first surface of the second panel, and extending substantially between the top and the bottom, the support member channel receiving the support member such that the support member is at least partially exposed to view along the first surface of the second panel.

13. The modular storage unit according to claim 1, wherein each of the first panel and the second panel includes an arcuate portion along the front edge extending inwardly away from the rear edge of the panel and upwardly toward the top of the panel.

14. The modular storage unit according to claim 1, wherein at least the first panel defines a cut-out portion relative to the front edge of the panel and adjacent the bottom of the panel.

15. The modular storage unit according to claim 14, further comprising a plug member dimensioned for receipt in the cut-out portion.

16. A modular storage unit for a vehicle, the storage unit comprising:

a first panel having a top, a bottom, a front edge, a rear edge, a first surface, a second surface opposite the first surface, and a channel recessed relative to the second surface of the first panel and disposed between a front edge and a rear edge of the first panel;

a second panel generally parallel to and opposite the first panel and spaced in a lateral direction from the first panel, the second panel having a top, a bottom, a front edge, a rear edge, a first surface, a second surface, and a channel recessed relative to the first surface of the second panel and disposed between a front edge and a rear edge of the second panel, the first surface of the second panel being oriented toward the second surface of the first panel;

a support member including a first coupling surface and a second coupling surface opposite the first coupling surface, wherein the first coupling surface of the support member is coupled to the second surface of the first panel such that the support member extends between the top and the bottom of the first panel, and the second coupling surface of the support member is spaced away from the second panel and in exposed facing relation to the first surface of the second panel; and a shelf removably disposed in the channels and abutting the second coupling surface of the support member;

wherein at least a portion of the front edge and the rear edge of at least one of the first and second panels is curved in a plane that is substantially parallel to the at least one of the first and second panels, and at least one of the first panel and the second panel comprises a polymer material; and wherein the shelf is directly fastened to the support member with a fastener that secures the shelf in the lateral direction relative to the support member.

17. The modular storage unit according to claim 16, and further comprising:

a slot recessed relative to the second surface of the first panel;

a slot recessed relative to the first surface of the second panel and positioned opposite the slot on the first panel, the slots being positioned immediately above an upper edge of the channels of the first and second panels and defining an opening adjacent the upper edge of the channels;

a door having a first side edge, a second side edge, a top, and a bottom, the door comprising a first pin integral with the first side edge of the door and a second pin integral with the second side edge of the door, the pins disposed adjacent the bottom of the door and configured for receipt in the slots, wherein the door is rotatably mounted to the first and second panels by positioning the first pin into the slot on the first panel, positioning the second pin into the slot on the second panel, and positioning the shelf into the channels immediately beneath the slots into which the pins of the door have been positioned.

18. The modular storage unit according to claim 16, and further comprising a channel formed in the second surface of the first panel, the channel disposed between the top and the bottom of the first panel and the channel receiving the support member.

19. The modular storage unit according to claim 16, and further comprising a support member coupled to the second panel, the support member including a first coupling surface and a second coupling surface opposite the first coupling surface, wherein the first coupling surface of the support member is coupled to the first surface of the second panel such that the support member extends between the top and the bottom of the second panel, and the second coupling surface of the support member is spaced away from the first panel and in exposed facing relation to the second surface of the first panel, the shelf also abutting the second coupling surface of the support member coupled to the second panel, and directly fastened to the support member coupled to the second panel with a fastener that secures the shelf in the lateral direction relative to the support member coupled to the second panel.

* * * * *